United States Patent
Osagawa

(10) Patent No.: US 11,159,303 B1
(45) Date of Patent: Oct. 26, 2021

(54) COMMUNICATION SYSTEM, LIST DISTRIBUTION STATION, COMMUNICATION METHOD, AND COMPUTER READABLE MEDIUM

(71) Applicant: Mitsubishi Electric Corporation, Tokyo (JP)

(72) Inventor: Daisuke Osagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/283,019

(22) PCT Filed: Nov. 20, 2018

(86) PCT No.: PCT/JP2018/042905
§ 371 (c)(1),
(2) Date: Apr. 6, 2021

(87) PCT Pub. No.: WO2020/105130
PCT Pub. Date: May 28, 2020

(51) Int. Cl.
*H04L 7/00* (2006.01)
*G06F 1/14* (2006.01)
*H04L 7/10* (2006.01)

(52) U.S. Cl.
CPC ............ *H04L 7/0012* (2013.01); *G06F 1/14* (2013.01); *H04L 7/0066* (2013.01); *H04L 7/10* (2013.01)

(58) Field of Classification Search
CPC ....... H04L 7/0012; H04L 7/10; H04L 7/0066; H04L 12/4625; H04L 7/0016; G06F 1/14;
(Continued)

(56) References Cited

U.S. PATENT DOCUMENTS 6,665,316 B1 * 12/2003 Eidson ...................... G06F 1/14
370/509
6,748,451 B2 * 6/2004 Woods ................. G04G 15/006
370/345
(Continued)

FOREIGN PATENT DOCUMENTS

JP 8-328690 A 12/1996
JP 10-283061 A 10/1998
(Continued)

OTHER PUBLICATIONS

"IEEE Standard for Local and Metropolitan Area Networks-Timing and Synchronization for Time-Sensitive Applications", IEEE, Standards Association, IEEE Std 802.1AS™-2020, pp. 1-419.
(Continued)

*Primary Examiner* — Phuong Phu
(74) *Attorney, Agent, or Firm* — Xsensus LLP

(57) ABSTRACT

A list distribution station of a communication station includes processing circuitry to record, in a memory, a grand master list containing a station code of a grand master and a station code of a communication station synchronized with the grand master, and receive a priority notification frame which contains, as a sender station code, a station code of a present grand master in the communication system. The processing circuitry is further included to decide, when notified of the station code of the present grand master, whether or not to update the grand master list based on the notified station code of the present grand master and the grand master list, and upon having decided to update the grand master list, to update the station code of the present grand master station on the grand master list with the notified station code of the present grand master station.

13 Claims, 17 Drawing Sheets

(58) Field of Classification Search
CPC ..... G06F 16/27; H04W 12/062; H04W 88/08; G04G 15/006; H04J 3/0652
USPC .......................................... 375/356, 373, 354
See application file for complete search history.

(56) References Cited

U.S. PATENT DOCUMENTS

| | | | |
|---|---|---|---|
| 7,269,648 B1* | 9/2007 | Krishnan | G06F 16/27 709/224 |
| 2004/0193990 A1 | 9/2004 | Ichiyoshi | |
| 2004/0196872 A1* | 10/2004 | Nakamura | H04J 3/0652 370/512 |
| 2004/0210798 A1 | 10/2004 | Higashi | |
| 2004/0225459 A1 | 11/2004 | Krishnaswamy et al. | |
| 2004/0225465 A1 | 11/2004 | Pramanick et al. | |
| 2004/0255216 A1 | 12/2004 | Ichiyoshi | |
| 2005/0022087 A1 | 1/2005 | Pramanick et al. | |
| 2005/0039079 A1 | 2/2005 | Higashi et al. | |
| 2005/0086273 A1* | 4/2005 | Loebbert | H04W 12/069 |
| 2005/0154550 A1 | 7/2005 | Singh et al. | |
| 2005/0154551 A1 | 7/2005 | Pramanick et al. | |
| 2005/0261855 A1 | 11/2005 | Machi et al. | |
| 2005/0262412 A1 | 11/2005 | Mukai et al. | |
| 2005/0262414 A1 | 11/2005 | Elston et al. | |
| 2008/0010524 A1 | 1/2008 | Higashi et al. | |
| 2008/0016396 A1 | 1/2008 | Higashi et al. | |
| 2008/0240072 A1* | 10/2008 | Bykovnikov | H04W 88/08 370/350 |
| 2010/0100761 A1 | 4/2010 | Carlson et al. | |
| 2010/0100762 A1 | 4/2010 | Carlson et al. | |
| 2010/0192135 A1 | 7/2010 | Krishnaswamy et al. | |
| 2013/0227008 A1 | 8/2013 | Yang | |
| 2014/0281037 A1 | 9/2014 | Spada et al. | |
| 2016/0127118 A1* | 5/2016 | Yun | H04L 7/0016 375/357 |
| 2016/0149692 A1* | 5/2016 | Kim | H04L 12/4625 370/503 |
| 2017/0078038 A1 | 3/2017 | Tashiro et al. | |
| 2017/0230126 A1 | 8/2017 | Yamada | |
| 2018/0062780 A1 | 3/2018 | Shimzu et al. | |

FOREIGN PATENT DOCUMENTS

| | | |
|---|---|---|
| JP | 2002-16586 A | 1/2002 |
| JP | 2006-234572 A | 9/2006 |
| JP | 2015-177275 A | 10/2015 |
| JP | 2015-188152 A | 10/2015 |
| JP | 2015-188159 A | 10/2015 |
| JP | 2018-37885 A | 3/2018 |
| JP | 2018-117227 A | 7/2018 |
| TW | I350965 B | 10/2011 |
| TW | I435202 B | 4/2014 |
| TW | I609576 B | 12/2017 |
| WO | 2013/189536 A1 | 12/2013 |

OTHER PUBLICATIONS

International Search Report and Written Opinion dated Feb. 12, 2019, received for PCT Application PCT/JP2018/042905, Filed on Nov. 20, 2018, 9 pages including English Translation.
"IEEE Standard for a Precision Clock Synchronization Protocol for Networked Measurement and Control Systems", IEEE Instrumentation and Measurement Society, IEEE Std 1588™-2008, Jul. 24, 2008, 8 pages.
Notice of Reason for Refusal dated Nov. 3, 2020, received for TW Application 108138355, 8 pages including English Translation.
Notice of Reasons for Refusal dated Jul. 16, 2019, received for JP Application 2019-532154, 5 pages including English Translation.
Decision to Grant dated Sep. 10, 2019, received for JP Application 2019-532154, 3 pages including English Translation.

* cited by examiner

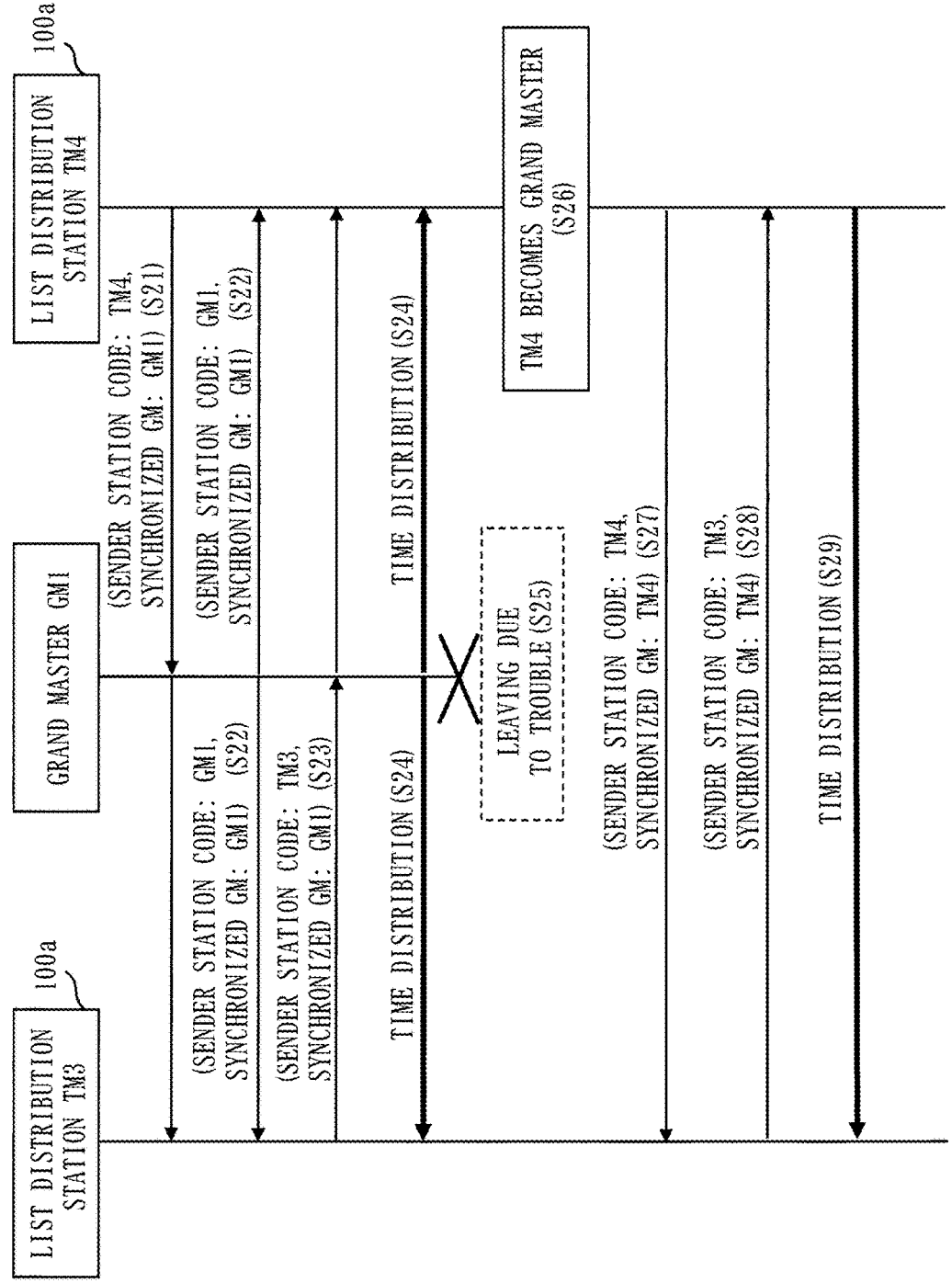

COMMUNICATION SYSTEM, LIST DISTRIBUTION STATION, COMMUNICATION METHOD, AND COMPUTER READABLE MEDIUM

CROSS-REFERENCE TO RELATED APPLICATION

The present application is based on PCT filing PCT/JP2018/042905, filed Nov. 20, 2018, the entire contents of which are incorporated herein by reference.

TECHNICAL FIELD

The present invention relates to a communication system, a list reference station, a list distribution station, a communication method, and a communication program.

BACKGROUND ART

According to a time synchronization communication protocol of a Factory Automation (FA) network, many stations do not have a highly accurate time synchronization source such as a Global Positioning System (GPS). Therefore, a station in the FA network station sometimes distributes a base time that largely deviates from the present time. This base time is used as a base for periodic control timing. If the FA network becomes discontinuous due to a large change of the base time, control cannot be performed correctly.

In recent years, the FA network has increasingly adopted IEEE 802.1AS as a time synchronization communication protocol. According to the time synchronization protocol IEEE 802.1AS, a station with the highest priority on the network, that is, a grand master station, is periodically selected. Then, the grand master station distributes the base time to the whole network.

For example, there is a case where a station A as a grand master station distributes a base time largely deviating from the present time, and a high-accuracy station B having priority higher than the station A and a small deviation from the present time is connected to the network. In this situation, the station B becomes the grand master station and distributes the base time to the whole network. As a result, the other stations on the network will be synchronized again with the time of the station B, leading to a large change of the time. When such a large time change occurs, a large discontinuity of the base time occurs. Then, the continuity of control cannot be maintained, and the control cannot be performed correctly.

Patent Literature 1 discloses a time synchronization method in which when a station other than the grand master station detects that a time difference between a time of its own station and a distributed base time is larger than a certain period of time, the grand master station is notified of this fact. In this time synchronization method, the grand master station that has received the notification lowers its own priority, and a grand master station in which a large time change does not occur is selected again, so that time continuity is guaranteed.

CITATION LIST

Patent Literature

Patent Literature 1: JP H08-328690 A

SUMMARY OF INVENTION

Technical Problem

In Patent Literature 1, every station on the network must be implemented with the time synchronization method of Patent Literature 1. Therefore, if there exists mixedly an IEEE 802.1AS compliant station that is not implemented with this time synchronization method, that is, a conventional station, unnecessary time synchronization is performed and a problem arises that time continuity may not be guaranteed.

An objective of the present invention is to guarantee time continuity even if a conventional station that is not implemented with a method of the present invention exists mixedly.

Solution to Problem

A communication system according to the present invention, which comprises a plurality of communication stations and selects from among the plurality of communication stations a grand master to serve as a base of times of the plurality of communication stations, includes
a list reference station being at least one communication station included among the plurality of communication stations,
wherein the list reference station comprises
a list recording unit to record, in a memory, a grand master list containing a station code of the grand master and a station code of a communication station synchronized with the grand master, and
a reference time correction unit to receive, from another communication station, a time distribution frame containing time information for synchronizing the times of the plurality of communication stations, to decide whether or not a station code of a communication station as a sender of the time distribution frame is the station code of the grand master contained in the grand master list, and if the station code of the communication station as the sender of the time distribution frame is the station code of the grand master contained in the grand master list, to correct a time of an own station using the time information contained in the time distribution frame.

Advantageous Effects of Invention

A communication system according to the present invention includes a list reference station that corrects its own time referring to a grand master list containing a station code of a grand master and a station code of a communication station synchronized with the grand master. Hence, with the communication system according to the present invention, the list reference station corrects the time based on the grand master list. This provides an effect that the occurrence of a large time change can be suppressed, and that time continuity can be guaranteed even when a general station that is not implemented with the method of the present invention exists mixedly.

BRIEF DESCRIPTION OF DRAWINGS

FIG. 17 shows a communication sequence illustrating a specific example of operations of a communication system according to Embodiment 3.

DESCRIPTION OF EMBODIMENTS

Figure 1:
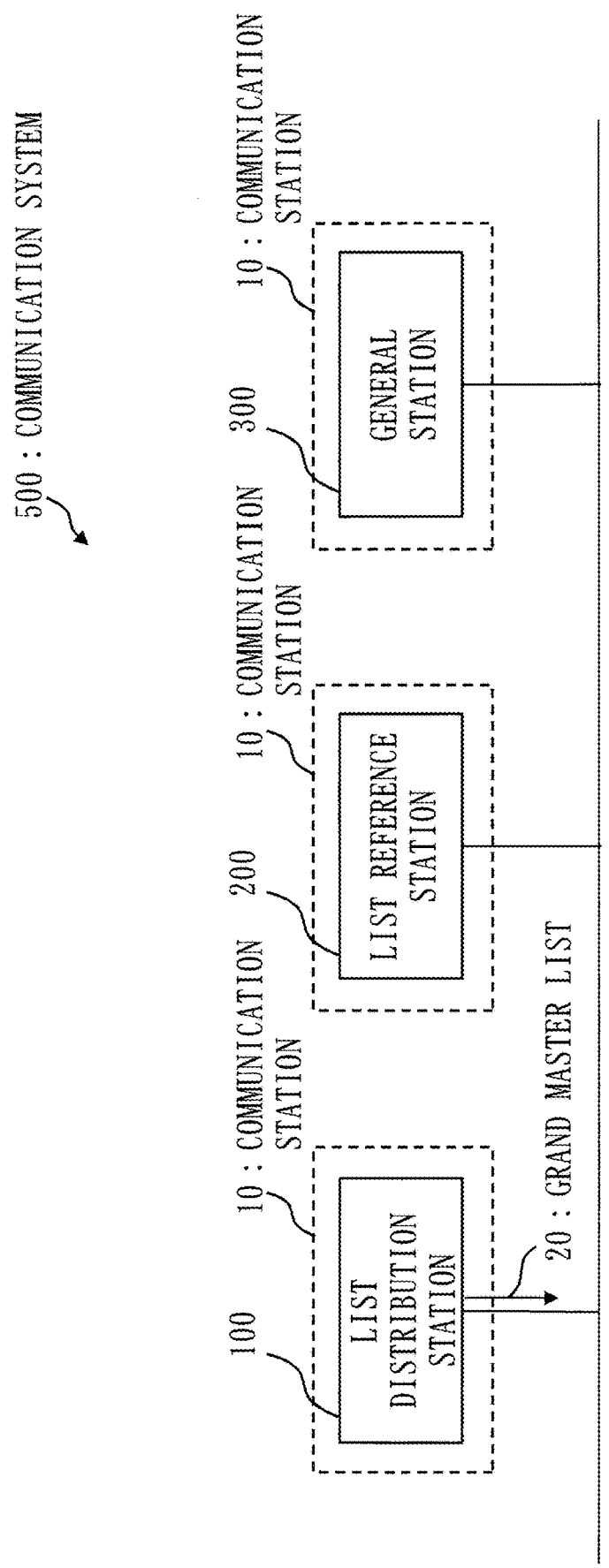
FIG. 1 shows an example of a network configuration diagram of a communication system according to Embodiment 1.

Embodiments of the present invention will be described with referring to drawings. In the drawings, the same or equivalent portions are denoted by the same reference sign. In description of the embodiments, as necessary, the same or equivalent portions will not be described or will be described simply.

Embodiment 1

*Description of Configurations*

FIG. 1 shows an example of a network configuration diagram of a communication system 500 according to the present embodiment.

The communication system 500 is provided with a plurality of communication stations 10. The communication system 500 selects from among the plurality of communication stations 10 a grand master to serve as a base of times of the plurality of communication stations 10.

The communication system 500 is provided with a list distribution station 100, a list reference station 200, and a general station 300.

The list distribution station 100 is at least one communication station included among the plurality of communication stations 10. That is, one or more list distribution stations 100 are provided to the communication system 500. The list distribution station 100 updates a grand master list 20 and distributes the updated grand master list 20 to the other communication stations. The list distribution station 100 also performs time synchronization. The grand master list 20 is a list containing a station code of the grand master and a station code of a communication station synchronized with the grand master. The list distribution station 100 is also called a grand master list distribution station.

The list reference station 200 is at least one communication station included among the plurality of communication station 10. That is, one or more list reference stations 200 are provided to the communication system 500. The list reference station 200 refers to the grand master list 20 to correct its own time. The list reference station 200 also performs time synchronization by referring only to a time distributed from the communication station contained in the grand master list 20. The list reference station 200 is also called a grand master list reference station.

The general station 300 only performs time synchronization. Zero or more general stations 300 are provided to the communication system 500. The general station 300 is a general station complying with IEEE 802.1AS and is called a conventional station or legacy.

Figure 2:
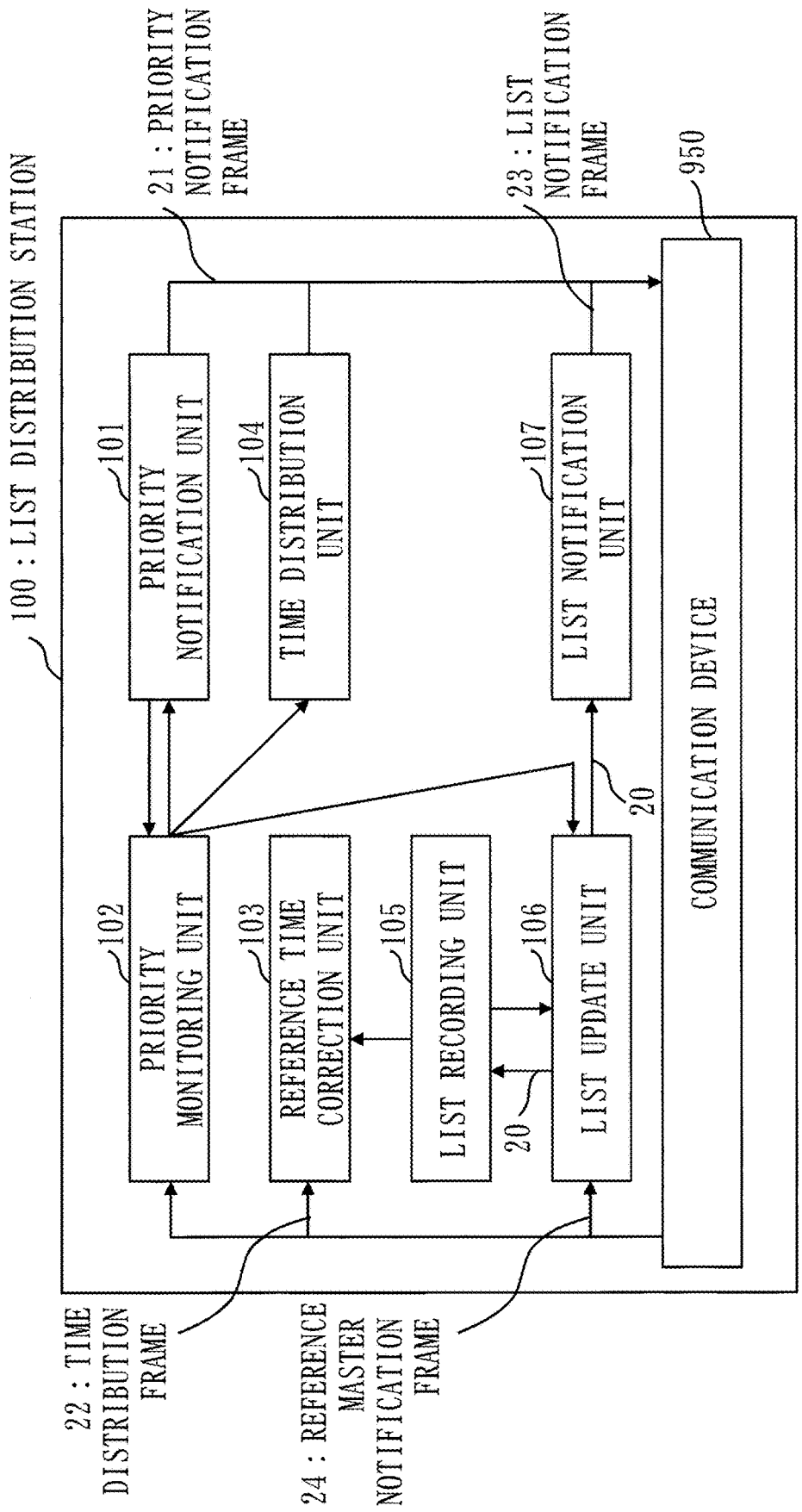
FIG. 2 is a function configuration diagram of a list distribution station according to Embodiment 1.

FIG. 2 is a function configuration diagram of the list distribution station 100 according to the present embodiment.

The list distribution station 100 is provided with a priority notification unit 101, a priority monitoring unit 102, a reference time correction unit 103, a time distribution unit 104, a list recording unit 105, a list update unit 106, and a list notification unit 107, as function elements.

Figure 3:
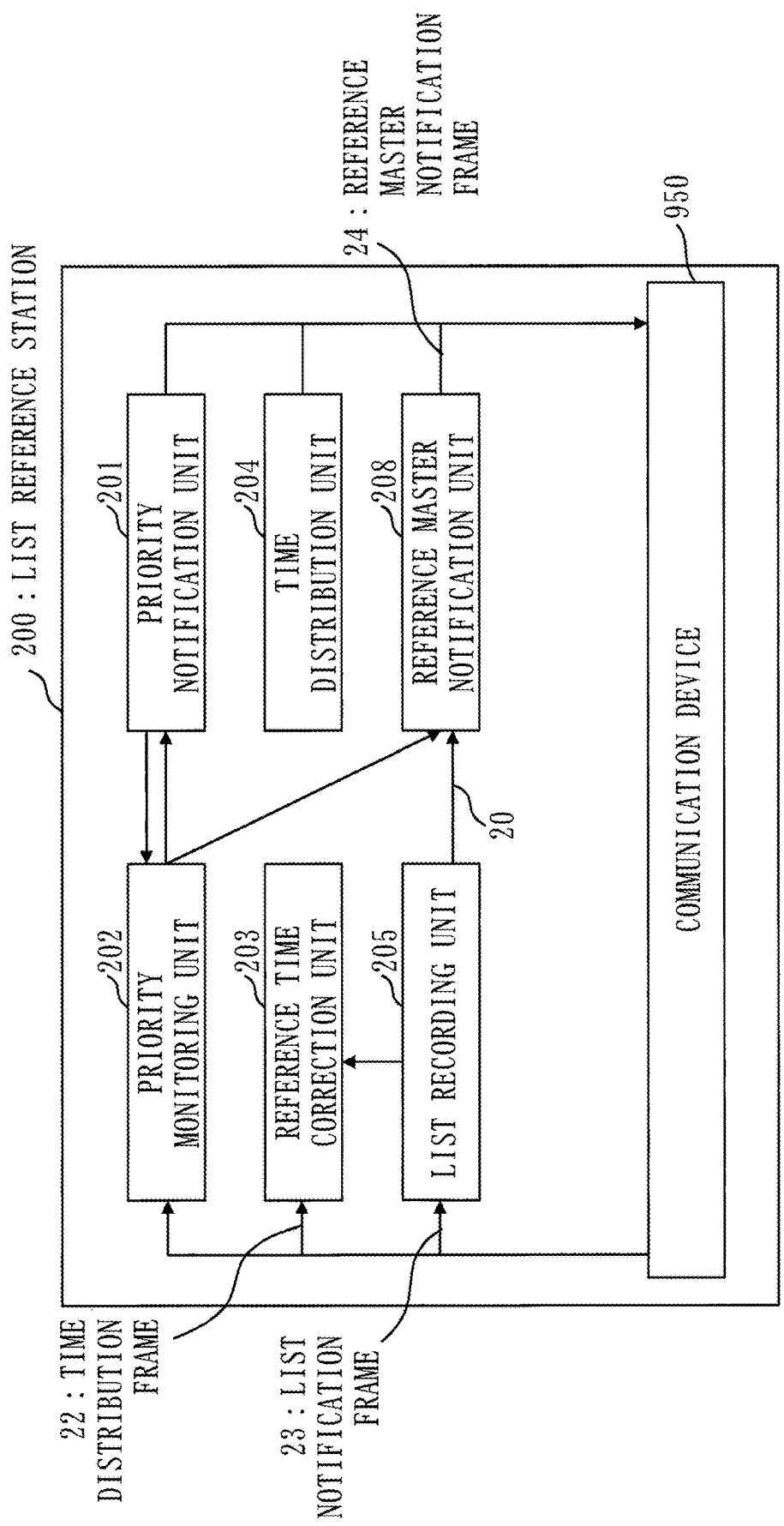
FIG. 3 is a function configuration diagram of a list reference station according to Embodiment 1.

FIG. 3 is a function configuration diagram of the list reference station 200 according to the present embodiment.

The list reference station 200 is provided with a priority notification unit 201, a priority monitoring unit 202, a reference time correction unit 203, a time distribution unit 204, a list recording unit 205, and a reference master notification unit 208, as function elements.

The priority notification unit 201, the priority monitoring unit 202, the reference time correction unit 203, the time distribution unit 204, and the list recording unit 205 have the same functions as those of the priority notification unit 101, priority monitoring unit 102, reference time correction unit 103, time distribution unit 104, and list recording unit 105, respectively, of the list distribution station 100.

Figure 4:
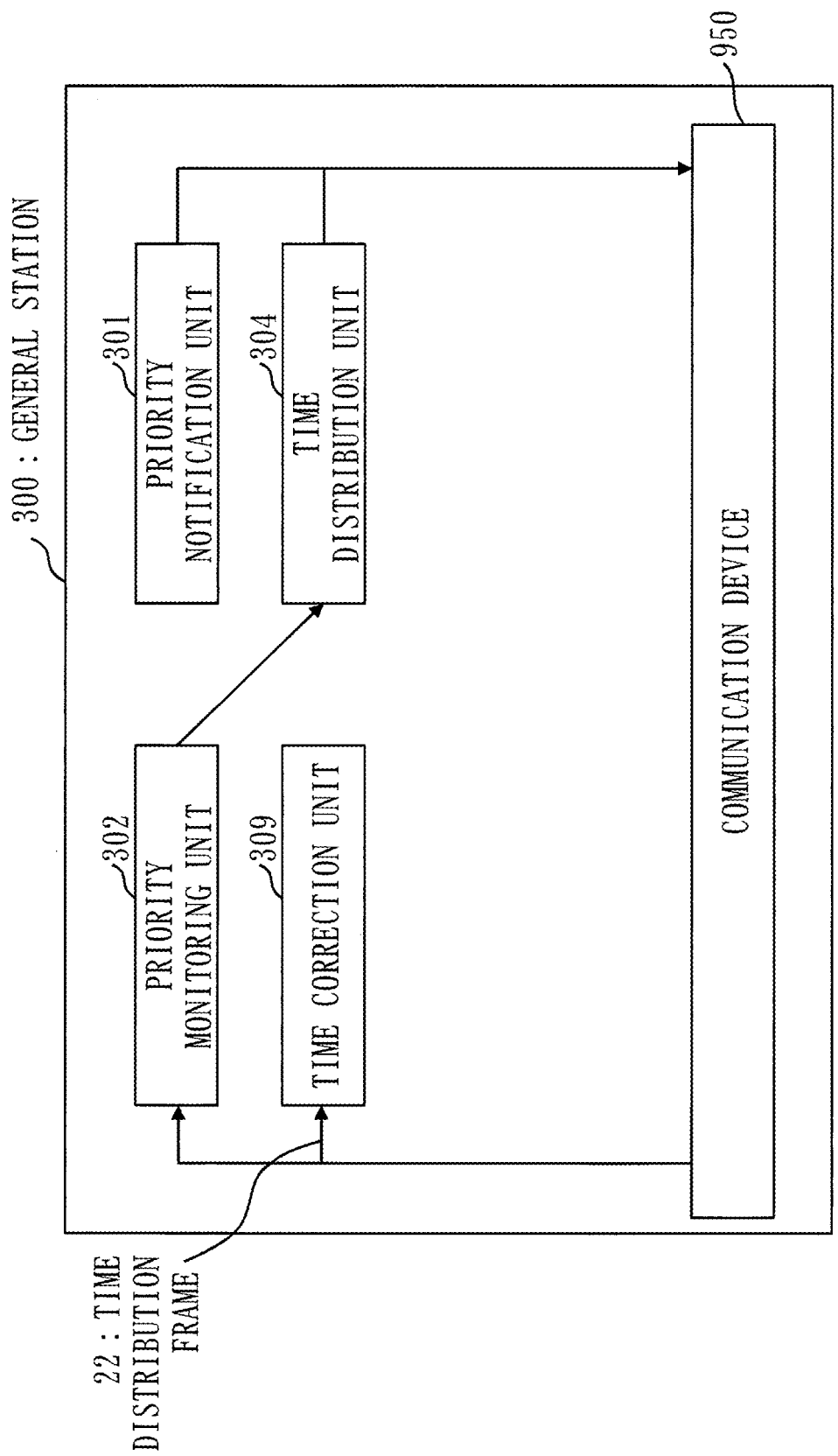
FIG. 4 is a function configuration diagram of a general station according to Embodiment 1.

FIG. 4 is a function configuration diagram of the general station 300 according to the present embodiment.

The general station 300 is provided with a priority notification unit 301, a priority monitoring unit 302, a time distribution unit 304, and a time correction unit 309, as function elements.

The priority notification unit 301, the priority monitoring unit 302, and the time distribution unit 304 have the same functions as those of the priority notification unit 101, priority monitoring unit 102, and time distribution unit 104, respectively, of the list distribution station 100.

The priority notification unit 101, when notified of sending start of a priority notification frame 21 by the priority monitoring unit 102, starts periodic sending of the priority notification frame 21. The priority notification frame 21 contains a sender station code and priority of the sender station. When notified of sending stop of the priority notification frame 21 by the priority monitoring unit 102, the priority notification unit 101 stops periodic sending of the priority notification frame 21.

The priority monitoring unit 102 monitors reception of the priority notification frame 21. The priority monitoring unit 102, upon reception of a priority notification frame 21 containing sender station priority higher than priority of its own station, performs the following processes.

(11) The priority monitoring unit 102 notifies the priority notification unit 101 of sending stop of the priority notification frame 21.

(12) The priority monitoring unit 102 notifies the time distribution unit 104 of cancellation of the grand master station.

(13) The priority monitoring unit 102 notifies the list update unit 106 that a station code of a present grand master station is the sender station code contained in the priority notification frame 21. In the case of the priority monitoring unit 202, the priority monitoring unit 202 notifies the reference master notification unit 208 that the station code of the present grand master station is the sender station code contained in the priority notification frame 21.

At the time of start-up of the priority monitoring unit 102 or after sending of the priority notification frame is stopped, if a priority notification frame 21 containing sender station priority higher than priority of its own station is not received for a certain period of time, the priority monitoring unit 102 notifies the priority notification unit 101 of sending start of the priority notification frame 21.

Then, after sending of the priority notification frame 21 is started, if a priority notification frame 21 containing sender station priority higher than priority of its own station is not received for a certain period of time, the priority monitoring unit 102 performs the following processes.

(21) The priority monitoring unit 102 notifies the time distribution unit 104 of selecting a grand master station.

(22) The priority monitoring unit 102 notifies the list update unit 106 that a station code of the present grand master station is its own station code. In the case of the priority monitoring unit 202 of the list reference station 200, the priority monitoring unit 202 notifies the reference master notification unit 208 that the station code of the current grand master station is its own station code.

The reference time correction unit 103 checks the grand master list 20 stored in the list recording unit 105. When the station code of the present grand master station on the grand master list 20 is none or the station code of the present grand master station on the grand master list 20 coincides with a sender station code of a received time distribution frame 22, the reference time correction unit 103 performs time correction referring to time information of the time distribution frame 22. The reference time correction unit 103 is also called a grand master list reference time correction function.

The time distribution unit 104, when notified of selecting a grand master station by the priority monitoring unit 102, starts periodic distribution of the time distribution frame 22. The time distribution frame 22 contains a sender station code and time information. Also, when notified of cancellation of a grand master station by the priority monitoring unit 102, the time distribution unit 104 stops periodic sending of the time distribution frame 22.

At the time of start, the list recording unit 105 stores in a memory a grand master list 20 in which a station code of the present grand master station is none and its own station code is included as a station code of a communication station synchronized with the present grand master station. An act of the list recording unit 105 of storing the grand master list 20 to the memory is also paraphrased as an act of the list recording unit 105 of recording the grand master list 20. The list recording unit 105, when notified of the grand master list 20 by the list update unit 106, records the notified grand master list 20.

In the case of the list recording unit 205 of the list reference station 200, the list recording unit 205 receives a list notification frame 23 containing a grand master list 20. The list recording unit 205, if its own station code is included as a station code of a communication station synchronized with a present grand master station on the grand master list 20 contained in the list notification frame 23, records the grand master list 20 contained in the list notification frame 23.

The list recording unit 105 is also called a grand master list recording function.

The list update unit 106 reads the grand master list 20 recorded in the list recording unit 105.

The list update unit 106, when notified of the station code of the present grand master station by the priority monitoring unit 102, performs a process (b) if a following condition (a) is satisfied.

(a) The station code of the present grand master station on the grand master list 20 is none, or the station code of the present grand master station on the grand master list 20 is other than none, and the station code of the present grand master station notified by the priority monitoring unit 102 is included as the station code of communication station synchronized with the present grand master station on the grand master list 20.

(b) The list update unit 106 updates the station code of the present grand master station on the grand master list 20 with the station code of the present grand master station which is notified by the priority monitoring unit 102. Furthermore, the list update unit 106 additionally writes the station code of the present grand master station which is notified by the priority monitoring unit 102, as the station code of the communication station synchronized with the present grand master station on the grand master list.

The list update unit 106, upon reception of a reference master notification frame 24, performs a process (d) if the following condition (c) is satisfied.

(c) A station code of a present grand master station contained in the reference master notification frame 24 coincides with the station code of the present grand master station on the grand master list 20.

(d) The list update unit 106 additionally writes the sender station code contained in the reference master notification frame 24 as a station code of a communication station synchronized with the present grand master station on the grand master list 20.

Furthermore, if the list update unit 106 receives neither (e) nor (f) of the following during a certain period of time, it deletes its sender station code, as the station code of the communication station synchronized with the present grand master station on the grand master list 20, except for its own station code. Namely, assume a case wherein the list update unit 106 does not receive neither one of the followings.

(e) A reference master notification frame 24 containing the same sender station code.

(f) A priority notification frame 21 containing the same sender station code. In this case, the list update unit 106 deletes the sender station code, as the station code of the stations synchronized with the present grand master station on the grand master list 20, except for its own station code.

When one of update, additional write, and delete mentioned above is conducted, the list update unit 106 notifies the list recording unit 105 and the list notification unit 107 of the grand master list 20. The list update unit 106 is also called a grand master list update function.

The list notification unit 107 periodically sends a list notification frame 23 containing a grand master list 20 notified by the list update unit 106. The list notification unit 107 is also called a grand master list notification sending function.

The reference master notification unit 208, when notified of the station code of the present grand master station by the priority monitoring unit 202, reads the grand master list 20 recorded in the list recording unit 205. The reference master notification unit 208 performs a process (h) if the following condition (g) is satisfied.

(g) The station code of the present grand master station on the grand master list 20 is none, or the station code of the present grand master station on the grand master list is other than none, and the station code of the present grand master station notified by the priority monitoring unit 202 coincides with the station code of the present grand master station on the grand master list 20.

(h) The reference master notification unit 208 generates a reference master notification frame 24 containing a sender station code and the station code of the present grand master station.

After generating the reference master notification frame 24, the reference master notification unit 208 periodically sends the reference master notification frame 24. The reference master notification unit 208 is also called a reference grand master notification sending function.

The time correction unit 309, upon reception of the time distribution frame 22, performs time correction referring to the time information of the time distribution frame 22.

Figure 5:
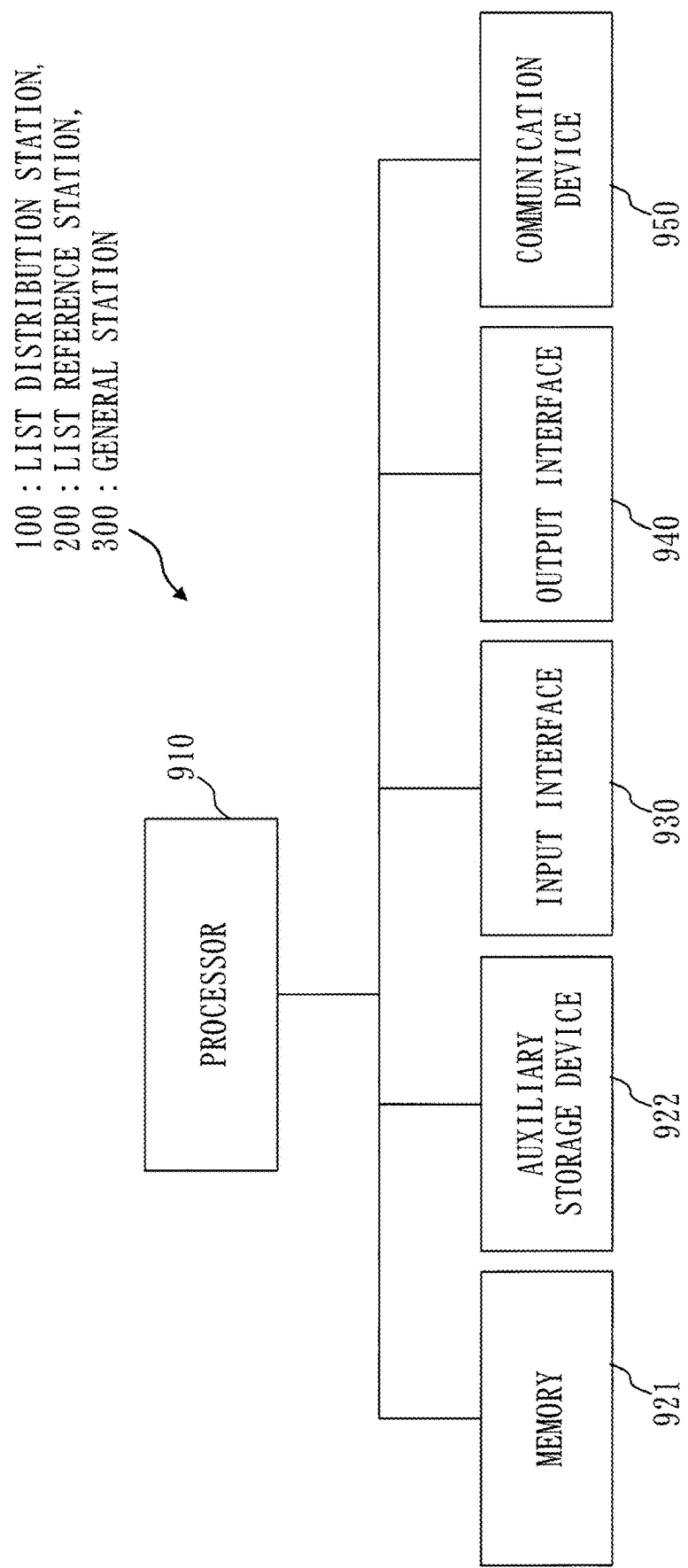
FIG. 5 presents an example of a hardware configuration of each of the list distribution station, list reference station, and general station of the communication system according to Embodiment 1.

FIG. 5 is a diagram illustrating an example of a hardware configuration of each of the list distribution station 100, list reference station 200, and general station 300 of the communication system 500 according to the present embodiment.

In the followings, the list distribution station 100, the list reference station 200, and the general station 300 will be individually called each station of the communication system 500.

Each station of the communication system 500 is a computer. Each station of the communication system 500 is provided with a processor 910, and is also provided with other hardware devices such as a memory 921, an auxiliary storage device 922, an input interface 930, an output interface 940, and a communication device 950. The processor 910 is connected to the other hardware devices via a signal line and controls the other hardware devices.

Functions of the priority notification unit 101, priority monitoring unit 102, reference time correction unit 103, time distribution unit 104, list recording unit 105, list update unit 106, and list notification unit 107 of the list distribution station 100 are implemented by software.

Functions of the priority notification unit 201, priority monitoring unit 202, reference time correction unit 203, time distribution unit 204, list recording unit 205, and reference master notification unit 208 of the list reference station 200 are implemented by software.

Functions of the priority notification unit 301, priority monitoring unit 302, time distribution unit 304, and time correction unit 309 of the general station 300 are implemented by software.

The processor 910 is a device that executes a communication program. The communication program is a program that implements the functions of the individual stations of the communication system 500.

The processor 910 is an Integrated Circuit (IC) which performs computation processing. Specific examples of the processor 910 include a CPU, a Digital Signal Processor (DSP), and a Graphics Processing Unit (GPU).

The memory 921 is a storage device that stores data temporarily. Specific examples of the memory 921 include a Static Random-Access Memory (SRAM) and a Dynamic Random-Access Memory (DRAM).

The auxiliary storage device 922 is a storage device that stores data. A specific example of the auxiliary storage device 922 is an HDD. The auxiliary storage device 922 may be a portable storage medium such as an SD (registered trademark) memory card, a CF, a NAND flash, a flexible disk, an optical disk, a compact disk, a blu-ray (registered trademark) disk, and a DVD. Note that HDD stands for Hard Disk Drive, SD (registered trademark) stands for Secure Digital, CF stands for CompactFlash (registered trademark), and DVD stands for Digital Versatile Disk.

The input interface 930 is a port to be connected to an input device such as a mouse, a keyboard, and a touch panel. The input interface 930 is specifically a Universal Serial Bus (USB) terminal. Alternatively, the input interface 930 may be a port to be connected to a Local Area Network (LAN).

The output interface 940 is a port to which a cable of an output apparatus such as a display is to be connected. The output interface 940 is specifically a USB terminal or a High-Definition Multimedia Interface (HDMI; registered trademark) terminal. The display is specifically a Liquid Crystal Display (LCD).

The communication device 950 has a receiver and a transmitter. The communication device 950 is connected to a communication network such as a LAN, the Internet, and a telephone line. The communication device 950 is specifically a communication chip or a Network Interface Card (NIC). Each station of the communication system 500 is connected to the other communication stations via the communication device 950.

The communication program is read by the processor 910 and executed by the processor 910. Not only the communication program but also an Operating System (OS) is stored in the memory 921. The processor 910 executes the communication program while executing the OS. The communication program and the OS may be alternatively stored in the auxiliary storage device 922. The communication program and the OS which are stored in the auxiliary storage device 922 are loaded to the memory 921 and executed by the processor 910. The communication program may be incorporated in the OS partially or entirely.

Each station of the communication system 500 may be provided with a plurality of processors that substitute for the processor 910. The plurality of processors share execution of the communication program. Each processor is a device that executes the communication program just as the processor 910 does.

Data, information, signal values, and variable values which are utilized, processed, or outputted by the communication program are stored in the memory 921, the auxiliary storage device 922, or a register or cache memory in the processor 910.

The term "unit" in each unit of each station of the communication system 500 may be replaced by "process", "procedure", or "stage". The term "process" that has replaced the term "unit" in each unit of each station of the communication system 500 may be replaced by "program", "program product", or "computer readable storage medium recorded with a program".

The communication program causes the computer to execute each process, each procedure, or each stage where the term "unit" in each unit mentioned above is replaced by "process", "procedure", or "stage". The communication method is a method implemented by the individual stations of the communication system 500 in executing the communication program.

The communication program may be stored in a computer readable recording medium and provided in the form of the recording medium. Alternatively, the communication program may be provided as a program product.

\*\*\*Description of Operations\*\*\*

Operations of each unit in each station of the communication system 500 according to the present embodiment will be described with referring to FIGS. 6 to 14.

When the list distribution station 100, the list reference station 200, and the general station 300 are started, they notify the priority notification units 101, 201, and 301, respectively, of sending start of the priority notification frame 21, via the priority monitoring units 102, 202, and 302, respectively.

Figure 6:
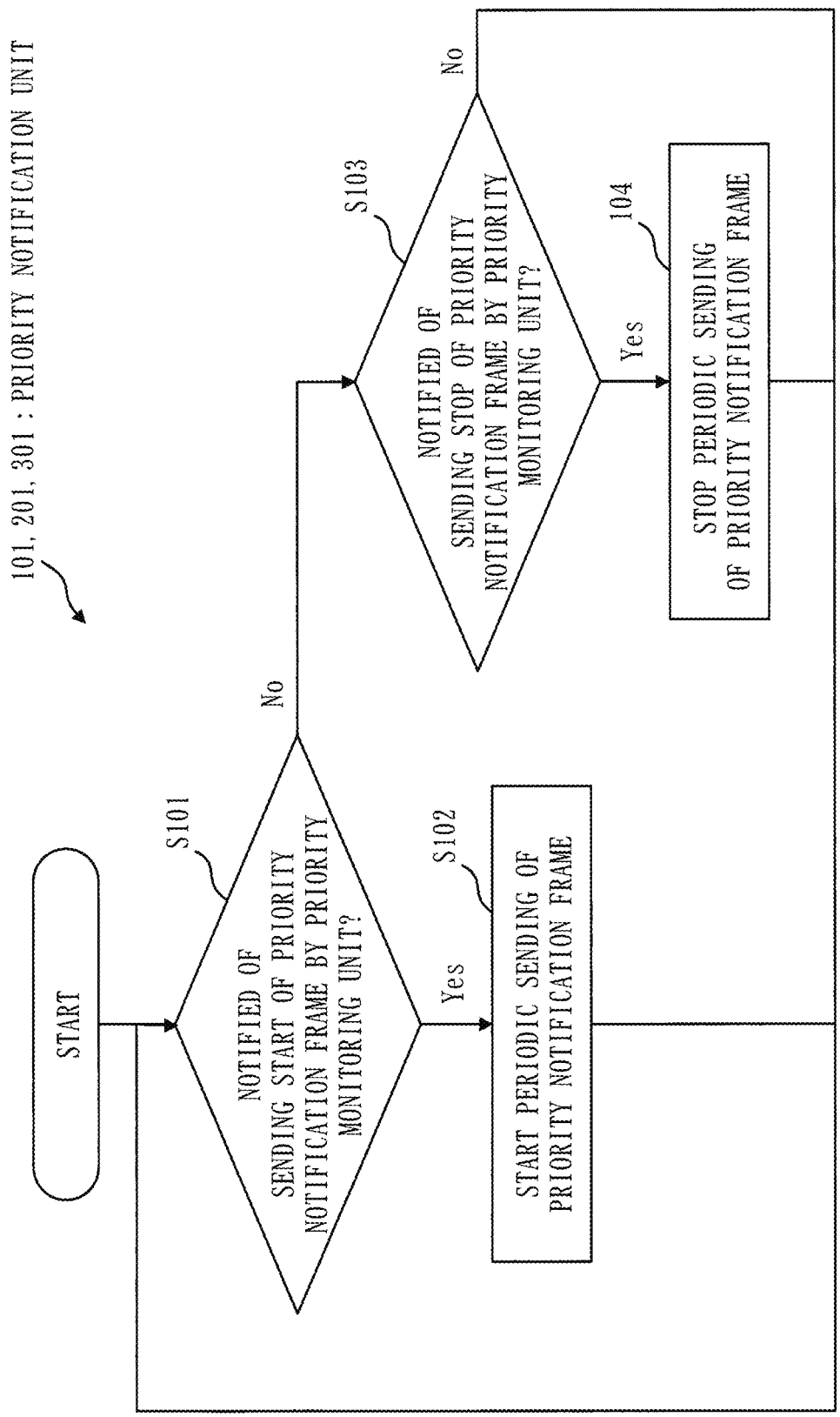
FIG. 6 is a flowchart illustrating operations of a priority notification unit of each station of the communication system according to Embodiment 1.

FIG. 6 is a flowchart illustrating operations of each of the priority notification units 101, 201, and 301 of the individual stations of the communication system 500 according to the present embodiment. The operations of the priority notification unit 101 of the list distribution station 100 will be described. The same applies also to the operations of the priority notification unit 201 of the list reference station 200 and the operations of the priority notification unit 301 of the general station 300.

The priority notification unit 101, when notified of sending start of the priority notification frame by the priority monitoring unit 102 (step S101), starts periodic sending of the priority notification frame 21 (step S102). When notified of sending stop of the priority notification frame 21 by the priority monitoring unit 102 (step S103), the priority notification unit 101 stops periodic sending of the priority notification frame 21 (step S104). The sender station code and the sender station priority are contained in the priority notification frame 21.

Figure 7:
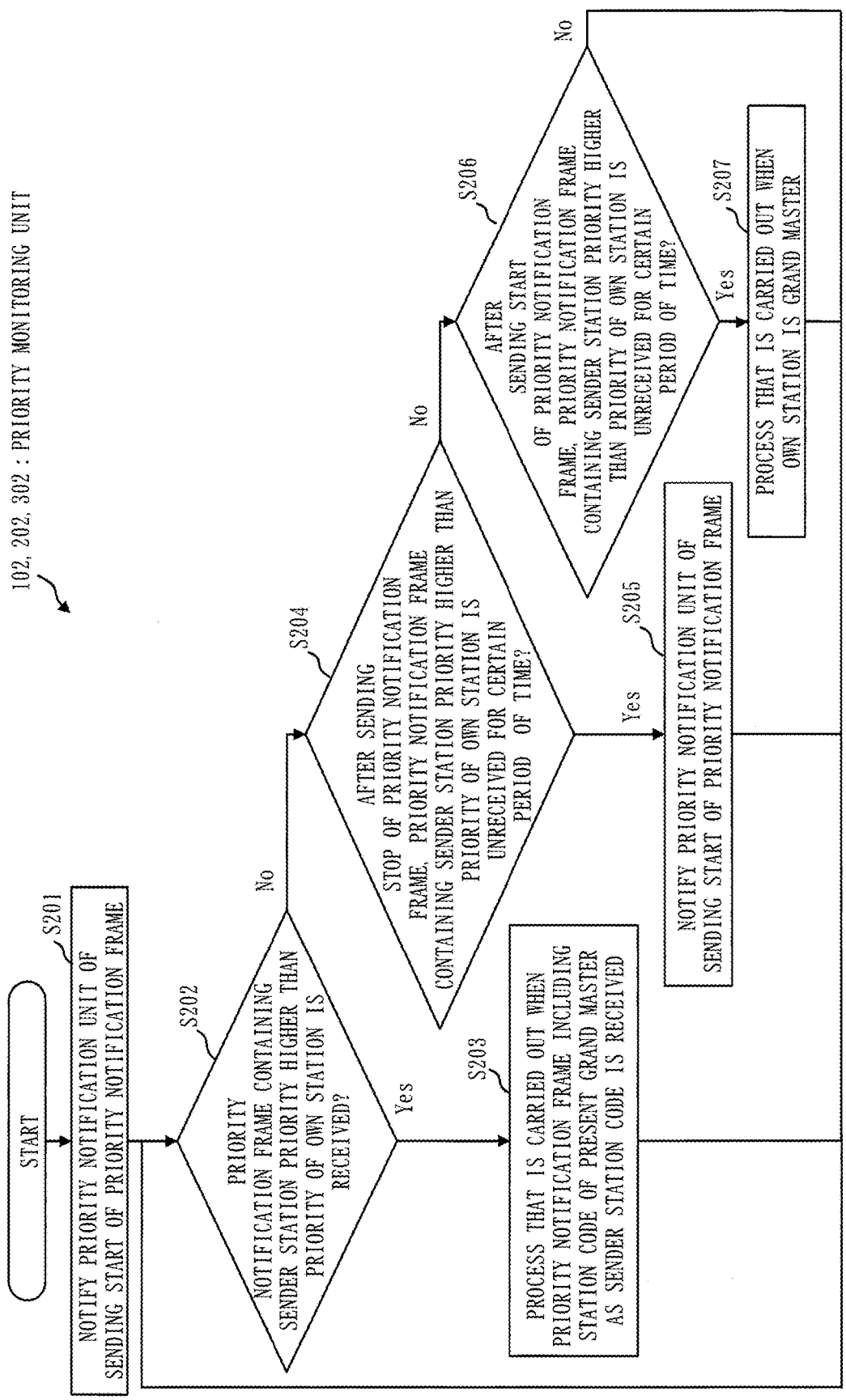
FIG. 7 is a flowchart illustrating operations of a priority monitoring unit of each station of the communication system according to Embodiment 1.

FIG. 7 is a flowchart illustrating operations of each of the priority monitoring units 102, 202, and 302 of the individual stations of the communication system 500 according to present embodiment. The operations of the priority monitoring unit 102 of the list distribution station 100 will be described. The same applies also to the operations of the priority monitoring unit 202 of the list reference station 200 and the operations of the priority monitoring unit 302 of the general station 300.

The priority monitoring unit 102 receives, for example, a priority notification frame 21 which contains, as a sender station code, a station code of a present grand master in the communication system 500.

This is specifically as follows.

In step S201, the priority monitoring unit 102 notifies the priority notification unit 101 of sending start of the priority notification frame 21.

In step S202, the priority monitoring unit 102 decides whether a priority notification frame 21 containing sender station priority higher than priority of its own station is received. If a priority notification frame 21 of a sender station having priority higher than the priority of its own station is received, the processing advances to step S203. If a priority notification frame 21 of a sender station having priority higher than the priority of its own station is not received, the priority monitoring unit 102 advances to step S204.

In step S203, the priority monitoring unit 102 decides that a priority notification frame 21 containing, as a sender station code, a station code of the present grand master in the communication system 500 is received, and performs the following processes. A process of step S203 is a process that is carried out when a priority notification frame 21 containing a station code of the present grand master as a sender station code is received.

(71) The priority monitoring unit 102 notifies the priority notification unit 101 of sending stop of the priority notification frame 21.

(72) The priority monitoring unit 102 notifies the time distribution unit 104 of cancellation of the grand master station.

(73) The priority monitoring unit 102 notifies the list update unit 106 that the station code of the present grand master station is the sender station code contained in the priority notification frame 21. In the case of the priority monitoring unit 202, the priority monitoring unit 202 notifies the reference master notification unit 208 that the station code of the present grand master station is the sender station code contained in the priority notification frame 21. In the case of the priority monitoring unit 302, the priority monitoring unit 302 does nothing at this time point.

In step S204, after sending of the priority notification frame 21 is stopped, if a priority notification frame 21 containing sender station priority higher than the priority of its own station is not received for a certain period of time, the priority monitoring unit 102 advances to step S205. After sending of the priority notification frame 21 is stopped, if a priority notification frame 21 containing sender station priority higher than the priority of its own station is received, the priority monitoring unit 102 advances to step S206.

In step S205, the priority monitoring unit 102 notifies the priority notification unit 101 of sending start of the priority notification frame 21, and periodically sends a priority notification frame 21 again.

In step S206, after sending of the priority notification frame 21 is started, if a priority notification frame 21 containing a sender station priority higher than the priority of its own station is not received for a certain period of time, the priority monitoring unit 102 advances to step S207. After sending of the priority notification frame is started, if a priority notification frame 21 containing a sender station priority higher than the priority of its own station is received, the priority monitoring unit 102 returns to step S202.

In step S207, the priority monitoring unit 102 decides that its own station is the grand master, and at the same time performs the following processes. Step S207 is a process that is carried out when the own station is the grand master.

(74) The priority monitoring unit 102 notifies the time distribution unit 104 of selecting the grand master station.

(75) The priority monitoring unit 102 notifies the list update unit 106 that the station code of the present grand master station is its own station code. In the case of the priority monitoring unit 202, the priority monitoring unit 202 notifies the reference master notification unit 208 that the station code of the present grand master station is its own station code. In the case of the priority monitoring unit 302, the priority monitoring unit 302 does nothing.

Figure 8:
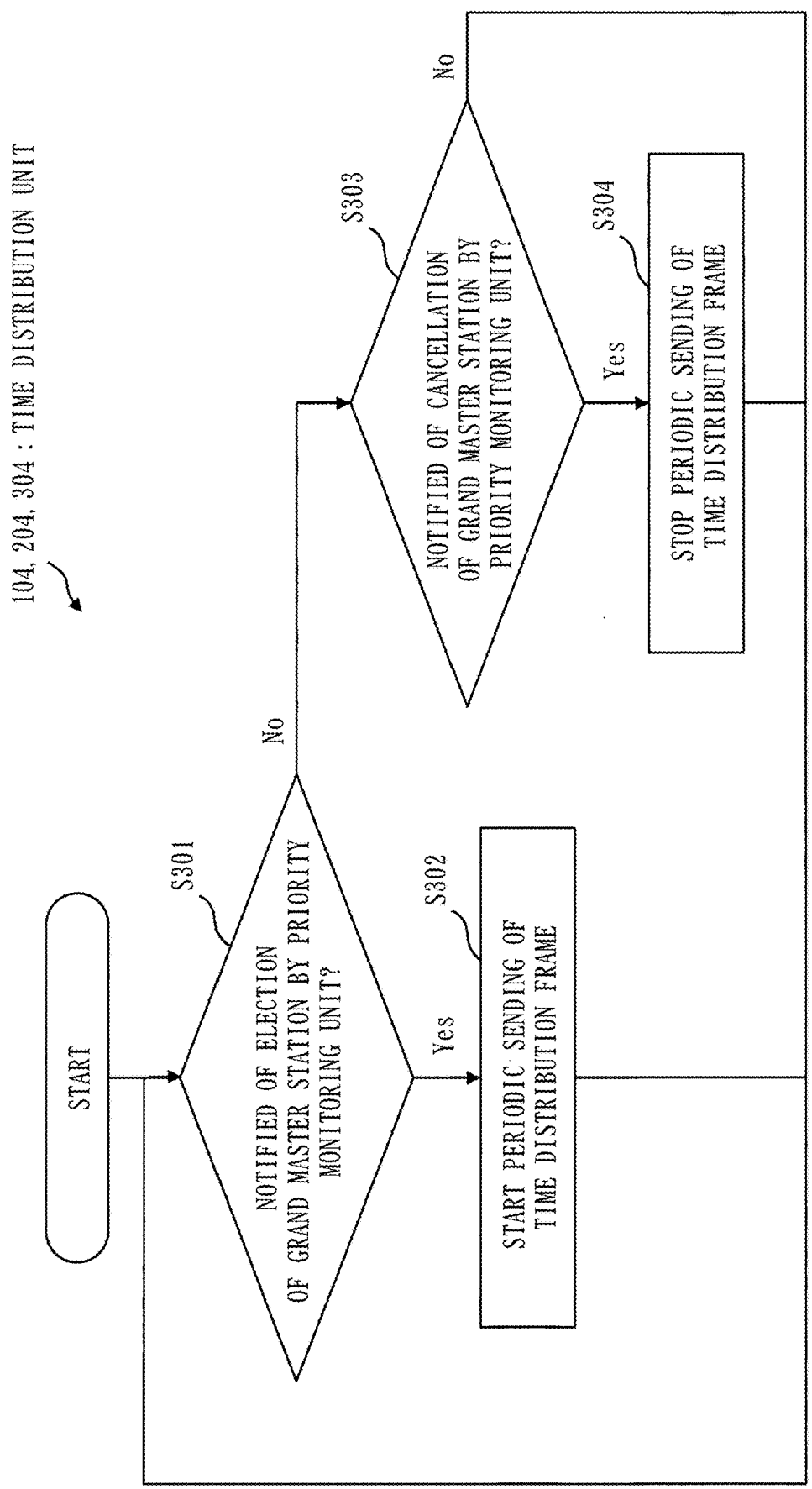
FIG. 8 is a flowchart illustrating operations of a time distribution unit of each station of the communication system according to Embodiment 1.

FIG. 8 is a flowchart illustrating operations of each of the time distribution units 104, 204, and 304 of the individual stations of the communication system 500 according to the present embodiment. The operations of the time distribution unit 104 of the list distribution station 100 will be described. The same applies also to the operations of the time distribution unit 204 of the list reference station 200 and the operations of the time distribution unit 304 of the general station 300.

The time distribution unit 104, when notified of selecting a grand master station by the priority monitoring unit 102 (step S301), starts periodic sending of a time distribution frame 22 (step S302). The time distribution frame 22 contains a sender station code and time information. When notified of cancellation of the grand master station by the priority monitoring unit 102 (step S303), the time distribution unit 104 stops periodic sending of the time distribution frame 22 (step S304).

Figure 9:
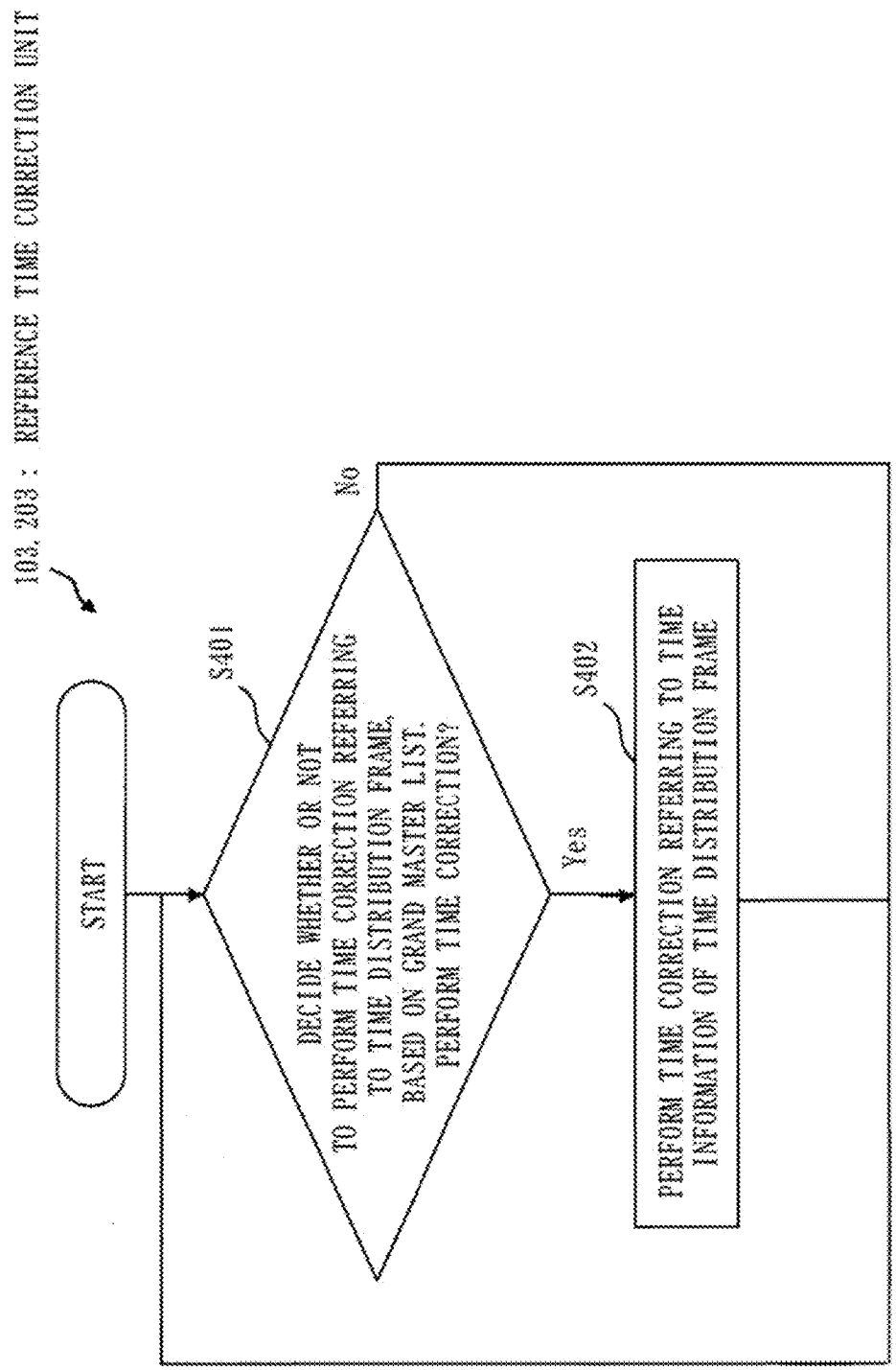
FIG. 9 is a flowchart illustrating operations of a reference time correction unit of each of the list distribution station and list reference station of the communication system according to Embodiment 1.

FIG. 9 is a flowchart illustrating operations of the reference time correction unit 103 of the list distribution station 100 and operations of the reference time correction unit 203 of the list reference station 200, of the communication system 500 according to the present embodiment. The operations of the reference time correction unit 103 of the list distribution station 100 will be described. The same applies also to the operations of the reference time correction unit 203 of the list reference station 200.

First, an outline of processing of the reference time correction unit 103 will be described.

The reference time correction unit 103 receives, from another communication station, a time distribution frame 22 containing time information for synchronizing the times of the plurality of communication stations. The reference time correction unit 103 decides whether or not a station code of a communication station as a sender of the time distribution frame 22 is the station code of the grand master contained in the grand master list 20. If the station code of the communication station as the sender of the time distribution frame 22 is the station code of the grand master contained in the grand master list 20, the reference time correction unit 103 corrects a time of its own station, using the time information contained in the time distribution frame 22.

In step S401, the reference time correction unit 103 decides whether or not to perform time correction referring to the time distribution frame 22, based on the grand master list 20. Specifically, the reference time correction unit 103 decides whether or not either (91) or (92) is satisfied.
(91) The station code of the present grand master station on the grand master list 20 recorded in the list recording unit 105 is none.
(92) The station code of the present grand master station on the grand master list 20 recorded in the list recording unit 105 coincides with the sender station code of the received time distribution frame 22.

The reference time correction unit 103, upon having decided that either (91) or (92) is satisfied, advances to step S402. Upon having decided that neither (91) nor (92) is satisfied, the reference time correction unit 103 returns to step S401, and waits to receive a time distribution frame 22.

In step S402, the reference time correction unit 103 performs time correction referring to the time information of the time distribution frame 22.

Figure 10:
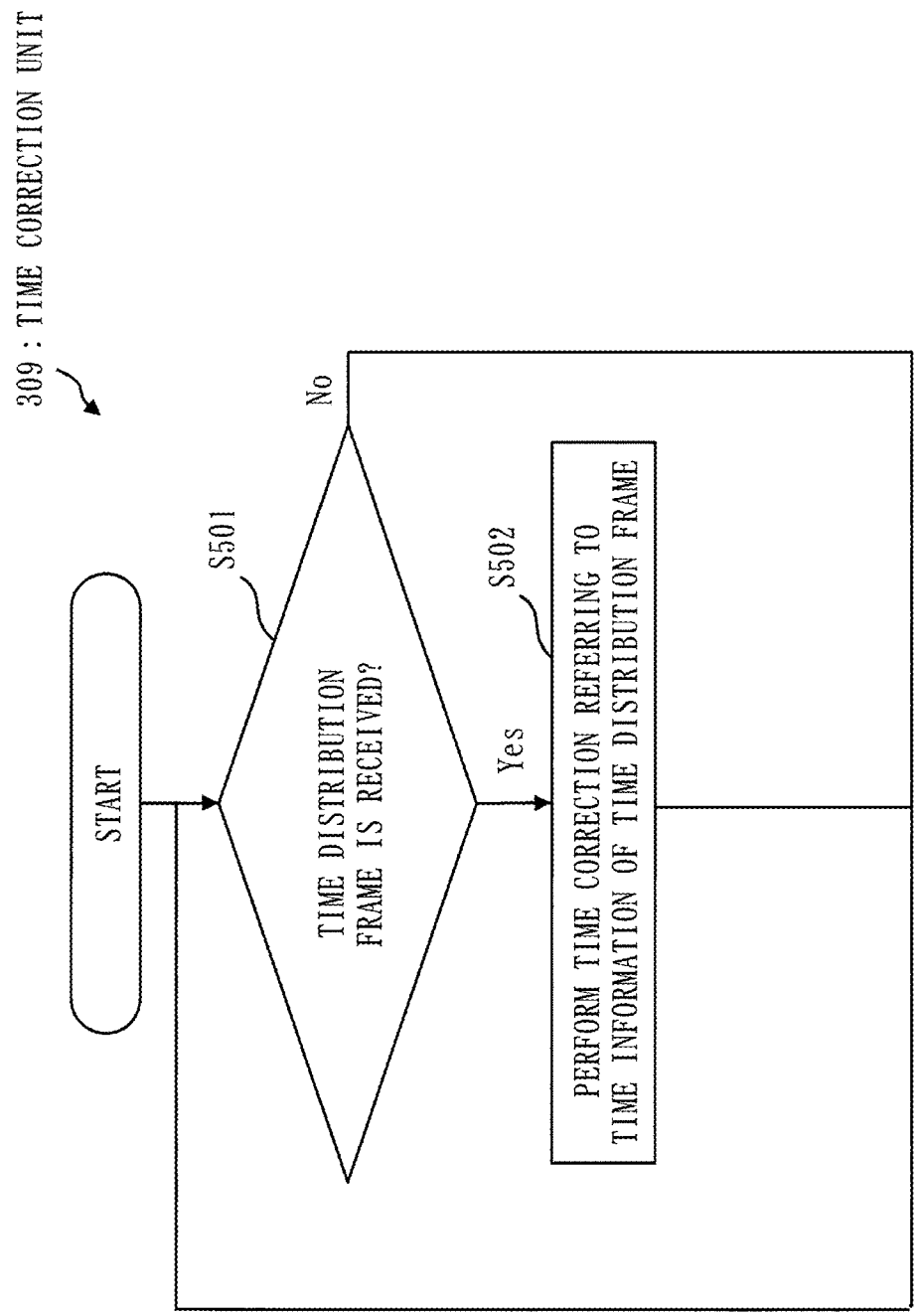
FIG. 10 is a flowchart illustrating operations of a time correction unit of the general station of the communication system according to Embodiment 1.

FIG. 10 is a flowchart illustrating operations of the time correction unit 309 of the general station 300 of the communication system 500 according to the present embodiment.

The time correction unit 309 of the general station 300, upon reception of the time distribution frame 22 (step S501), performs time correction referring to the time information of the time distribution frame 22 (step S502).

Figure 11:
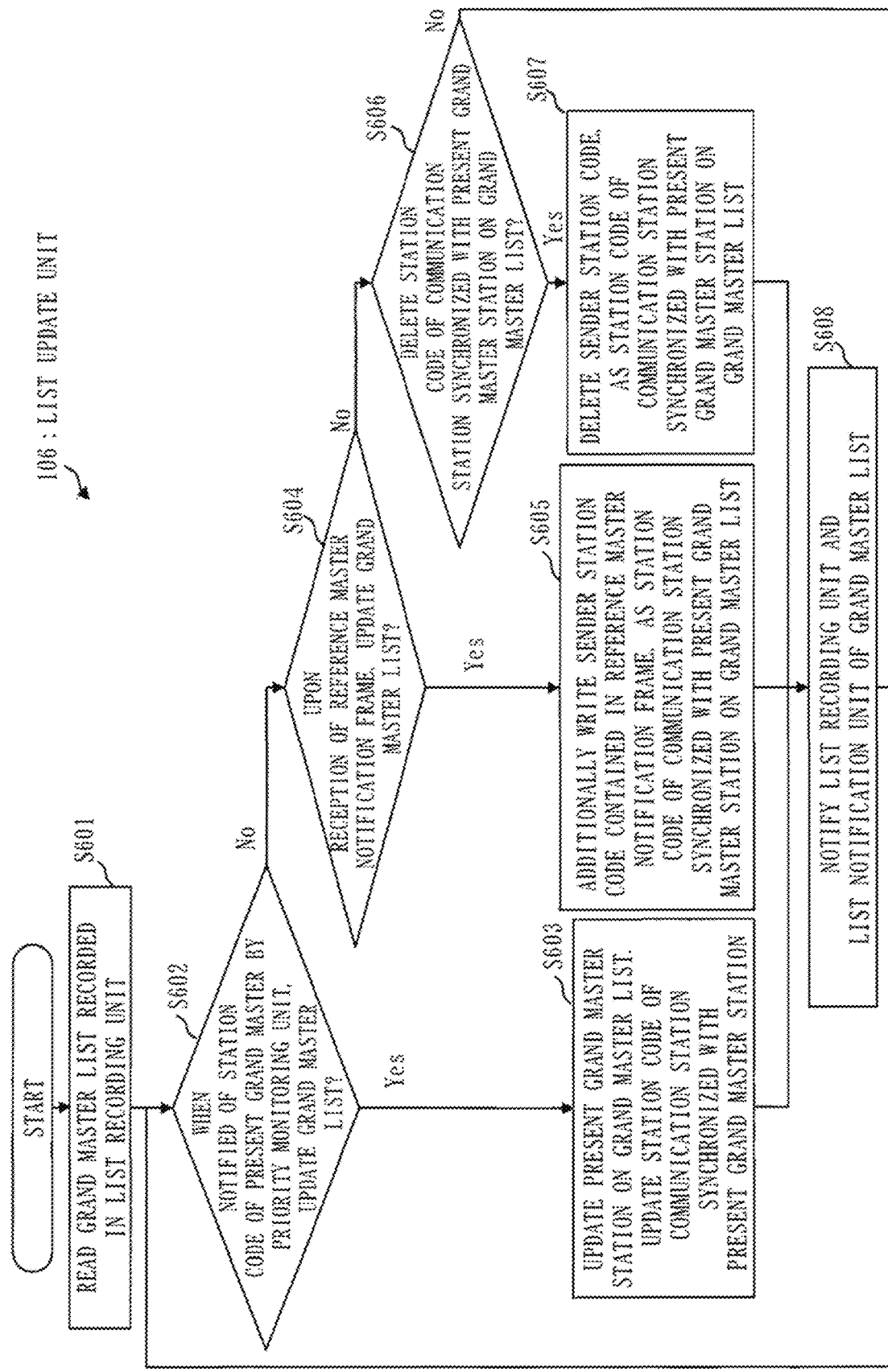
FIG. 11 is a flowchart illustrating operations of a list update unit of the list distribution station of the communication system according to Embodiment 1.

FIG. 11 is a flowchart illustrating operations of the list update unit 106 of the list distribution station 100 of the communication system 500 according to the present embodiment.

First, an outline of processing of the list update unit 106 will be described, The list update unit 106, when notified of the station code of the present grand master by the priority monitoring unit 102, decides whether or not to update the grand master list 20 based on the notified station code of the present grand master. The list update unit 106, upon having decided to update the grand master list 20, updates the station code of the present grand master station on the grand master list 20 with the station code of the present grand master station which is notified by the priority monitoring unit 102. Furthermore, the list update unit 106 additionally writes the station code of the present grand master station which is notified by the priority monitoring unit 102, as the station code of the communication station synchronized with the present grand master station on the grand master list 20.

The list update unit 106 decides whether or not the station code of the present grand master station notified by the priority monitoring unit 102 is included as the station code of the communication station synchronized with the present grand master station on the grand master list 20. If the station code of the present grand master station notified by the priority monitoring unit 102 is included as the station code of the communication station synchronized with the present grand master station on the grand master list, the list update unit 106 decides to update the grand master list 20.

In step S601, the list update unit 106 reads the grand master list 20 from the list recording unit 105. For example, when notified of the station code of the present grand master by the priority monitoring unit 102, the list update unit 106 reads the grand master list 20 from the list recording unit 105.

In step S602, when notified of the station code of the present grand master by the priority monitoring unit 102, the list update unit 106 decides whether or not to update the grand master list. The list update unit 106 decides whether or not to update the grand master list 20, based on the station code of the present grand master notified by the priority monitoring unit 102. Specifically, the list update unit 106 decides whether either (111) or (112) of the following is satisfied.
(111) The station code of the present grand master station on the grand master list 20 is none.
(112) The station code of the present grand master station on the grand master list 20 is other than none, and the station code of the present grand master station notified by the priority monitoring unit 102 is included as the station code of the communication station synchronized with the present grand master station on the grand master list 20.

If either (111) or (112) is satisfied, the list update unit 106 advances to step S603. If neither (111) nor (112) is satisfied, the list update unit 106 advances to step S604.

If either (111) or (112) is satisfied, this means that the list update unit 106 has decided to update the grand master list 20.

In step S603, the list update unit 106, upon having decided to update the grand master list 20, updates the station code of the present grand master station on the grand master list 20 with the station code of the present grand master station notified by the priority monitoring unit 102. Furthermore, the list update unit 106 additionally writes the station code of the present grand master station which is notified by the priority monitoring unit 102, as the station code of the communication station synchronized with the present grand master station on the grand master list 20.

In step S604, the list update unit 106, upon reception of the reference master notification frame 24, decides whether or not to update the grand master list 20.

The list update unit 106 receives the reference master notification frame 24 from the reference master notification unit 208. Based on the station code of the present grand master station contained in the received reference master notification frame 24, the list update unit 106 decides whether or not to update the grand master list 20. Upon having decided to update the grand master list 20, the list update unit 106 additionally writes the sender station code contained in the reference master notification frame 24, as the station code of the communication station synchronized with the present grand master station on the grand master list 20. The list update unit 106 decides whether or not the station code of the present grand master station contained in the reference master notification frame 24 received from the reference master notification unit 208 coincides with the station code of the present grand master station on the grand master list 20. If coincidence is found, the list update unit 106 decides to update the grand master list 20.

Specifically, the list update unit 106 makes a decision on whether (113) the station code of the present grand master station contained in the reference master notification frame 24 coincides with the station code of the present grand master station on the grand master list 20.

If the above (113) is satisfied, the list update unit 106 advances to step S605. If the above (113) is not satisfied, the list update unit 106 advances to step S606.

In step S605, the list update unit 106 additionally writes the sender station code contained in the reference master notification frame 24, as the station code of the communication station synchronized with the present grand master station on the grand master list 20.

In step S606, the list update unit 106 decides whether it is necessary to delete the station code of the communication station synchronized with the present grand master station on the grand master list 20. The list update unit 106 decides whether neither a reference master notification frame 24 containing the same sender station code nor a priority notification frame 21 containing the same sender station code is received within a predetermined period of time. If neither the reference master notification frame 24 nor the priority notification frame 21 is received, the list update unit 106 deletes its sender station code, as the station code of the communication station synchronized with the present grand master station on the grand master list 20.

Specifically, the list update unit 106 makes a decision on whether (114) neither a reference grand master notification frame containing the same sender station code nor a priority notification frame containing the same sender station code is received during a certain period of time.

If the above (114) is satisfied, the list update unit 106 advances to step S607. If the above (114) is not satisfied, the list update unit 106 returns to step S602.

In step S607, the list update unit 106 deletes its sender station code, as the station code of the communication station synchronized with the present grand master station on the grand master list 20, except for its own station code.

Finally, in step S608, when one of update, additional write, and delete mentioned above is conducted, the list update unit 106 notifies the list recording unit 105 and the list notification unit 107 of the grand master list 20.

Figure 12:
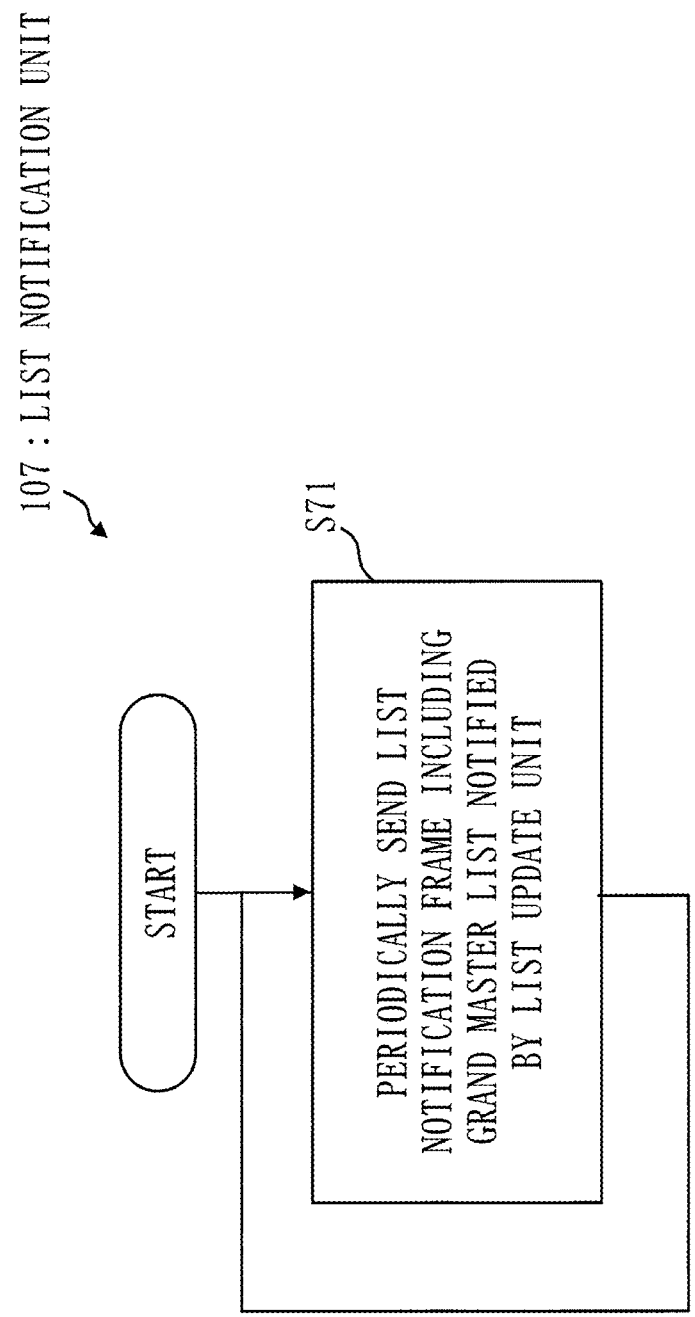
FIG. 12 is a flowchart illustrating operations of a list notification unit of the list distribution station of the communication system according to Embodiment 1.

FIG. 12 is a flowchart illustrating operations of the list notification unit 107 of the list distribution station 100 of the communication system 500 according to the present embodiment.

In step S71, the list notification unit 107, when notified of the grand master list 20 updated by the list update unit 106, sends a list notification frame 23 containing the notified grand master list 20 to a plurality of communication stations. The list notification unit 107 periodically sends the list notification frame 23 containing the grand master list 20 notified by the list update unit 106.

Figure 13:
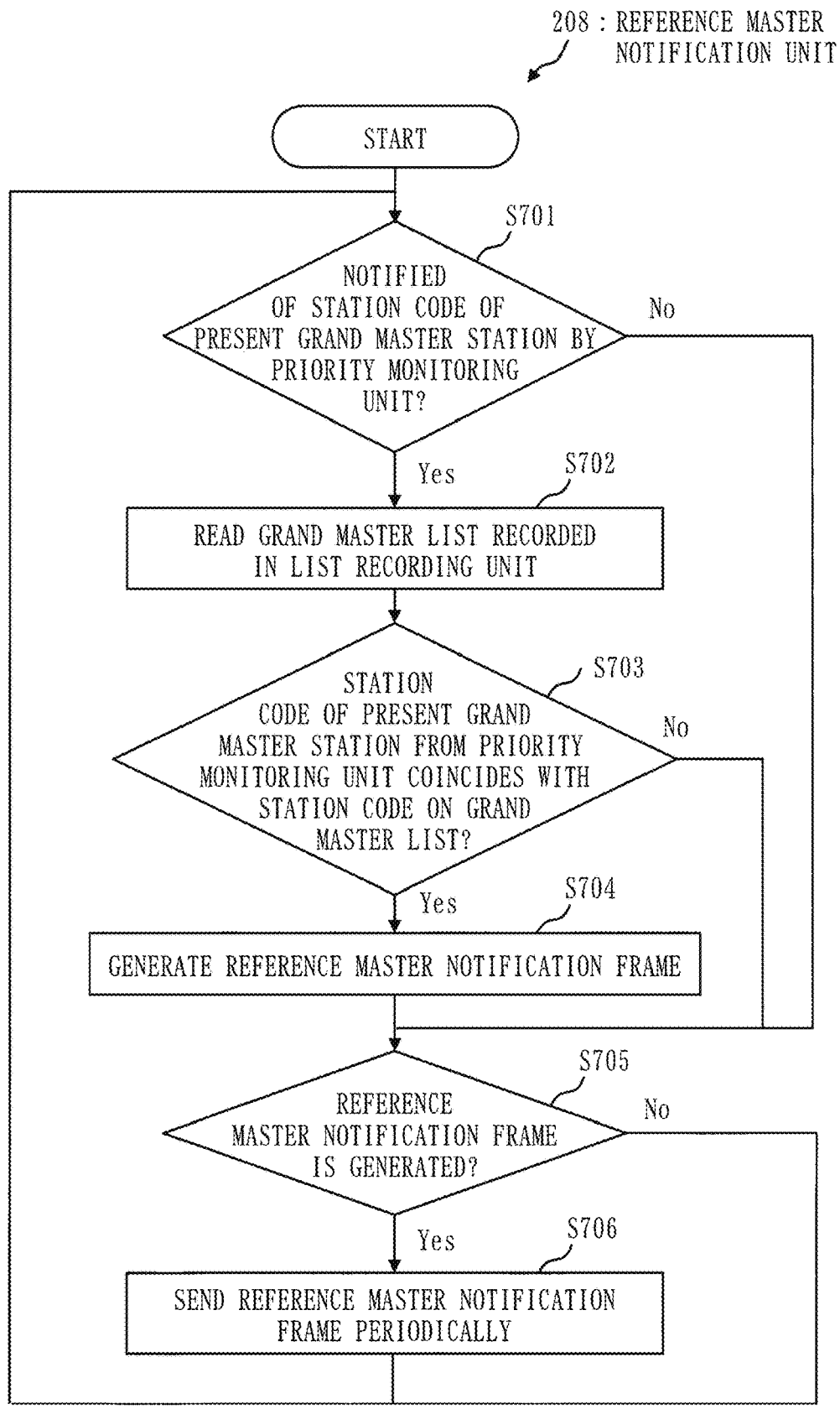
FIG. 13 is a flowchart illustrating operations of a reference master notification unit of the list reference station of the communication system according to Embodiment 1.

FIG. 13 is a flowchart illustrating operations of the reference master notification unit 208 of the list reference station 200 of the communication system 500 according to the present embodiment.

First, an outline of the operations of the reference master notification unit 208 will be described.

The reference master notification unit 208 is notified of the station code of the present grand master by the priority monitoring unit 202. The reference master notification unit 208 decides whether or not the station code of the present grand master is a station code of a grand master contained in the grand master list 20. If the station code of the present grand master is the station code of the grand master contained in the grand master list 20, the reference master notification unit 208 treats the station code of its own station as the sender station code, and sends a reference master notification frame 24 containing the sender station code and the station code of the present grand master station.

Specifically, the reference master notification unit 208 performs the following processes.

When notified of the station code of the present grand master station by the priority monitoring unit 202 (step S701), the reference master notification unit 208 reads the grand master list recorded in the list recording unit 205 (step S702).

In step S703, the reference master notification unit 208 decides whether or not the station code of the present grand master station notified by the priority monitoring unit 202 coincides with the station code of the present grand master station on the grand master list 20. The reference master notification unit 208 decides whether either (131) or (132) of the following is satisfied.

(131) The station code of the present grand master station on the grand master list is none.

(132) The station code of the present grand master station on the grand master list is other than none, and the station code of the present grand master station notified by the priority monitoring unit 202 coincides with the station code of the present grand master station on the grand master list.

If either (131) or (132) of the above is satisfied, the reference master notification unit 208 advances to step S704.

If neither (131) nor (132) of the above is satisfied, the reference master notification unit 208 advances to step S705.

In step S704, the reference master notification unit 208 generates a reference master notification frame 24. The reference master notification frame 24 contains the sender station code (that is, the station code of its own station) and the station code of the present grand master station.

After generating the reference master notification frame 24 (step S705), the reference master notification unit 208 sends the reference master notification frame 24 periodically (step S706).

Figure 14:
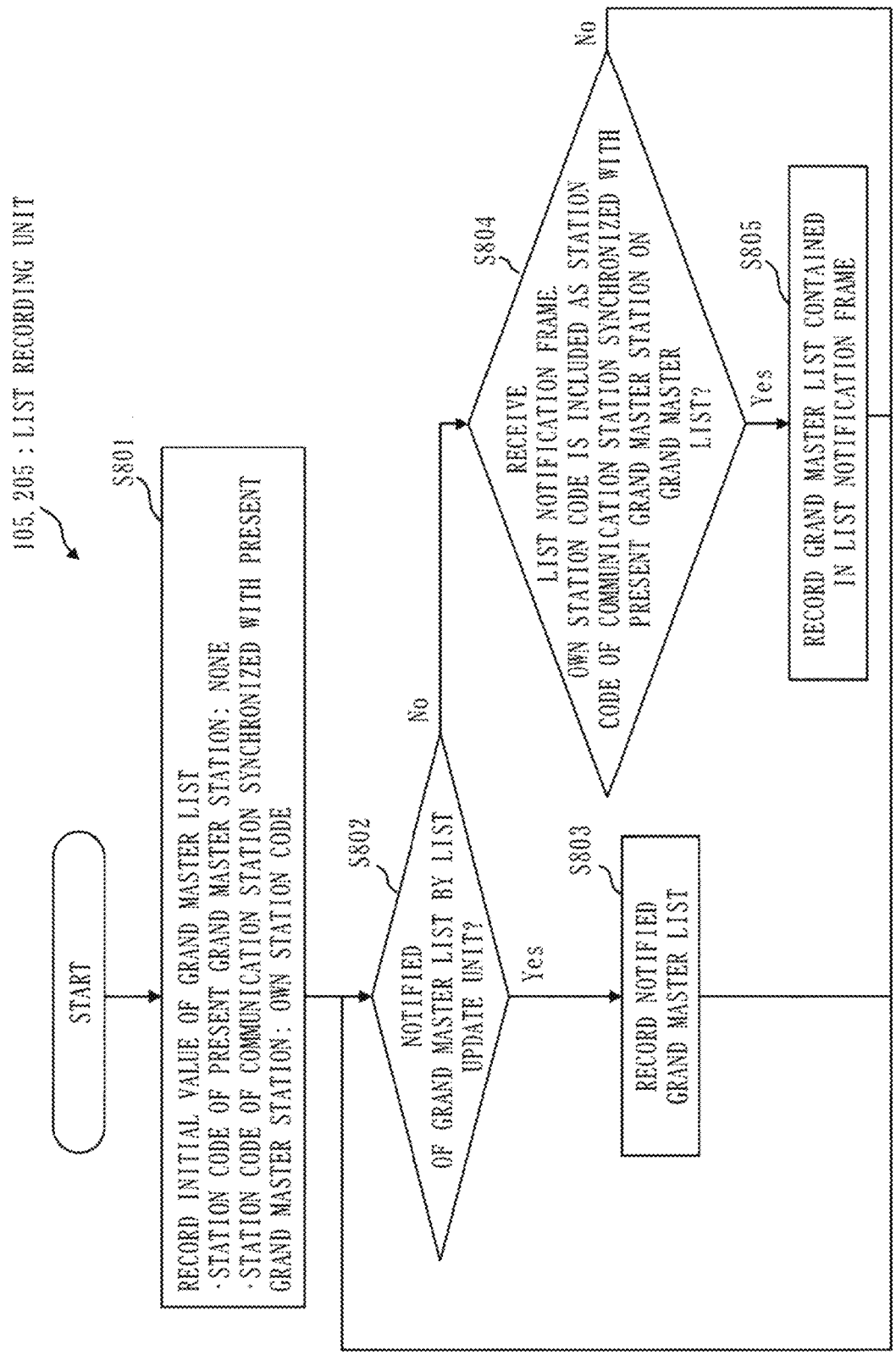
FIG. 14 is a flowchart illustrating operations of a list recording unit of each of the list distribution station and list reference station of the communication system according to Embodiment 1.

FIG. 14 is a flowchart illustrating operations of the list recording unit 105 of the list distribution station 100 and operations of the list recording unit 205 of the list reference station 200, of the communication system 500 according to the present embodiment. The operations of the list recording unit 105 of the list distribution station 100 will be described. The same applies also to the operations of the list recording unit 205 of the list reference station 200.

When the list recording unit 105 is started, it records, as the initial value, the grand master list 20 containing "a station code of a present grand master station: none" and "a station code of a station synchronized with the present grand master station: own station code" (step S801). When notified of the grand master list 20 by the list update unit 106 (step S802), the list recording unit 105 records the notified grand master list 20 (step S803).

In the case of the list recording unit 205 of the list reference station 200, the list recording unit 205, upon reception of a list notification frame 23 containing the grand master list 20, performs the following processes.

In step S804, the list recording unit 205 receives the list notification frame 23 containing the grand master list 20, and decides whether or not its own station code is included as the station code of the communication station synchronized with the present grand master station on the grand master list 20 contained in the list notification frame 23. If its own station code is included, then in step S805, the list recording unit 205 records the grand master list 20 contained in the list notification frame 23.

Figure 15:
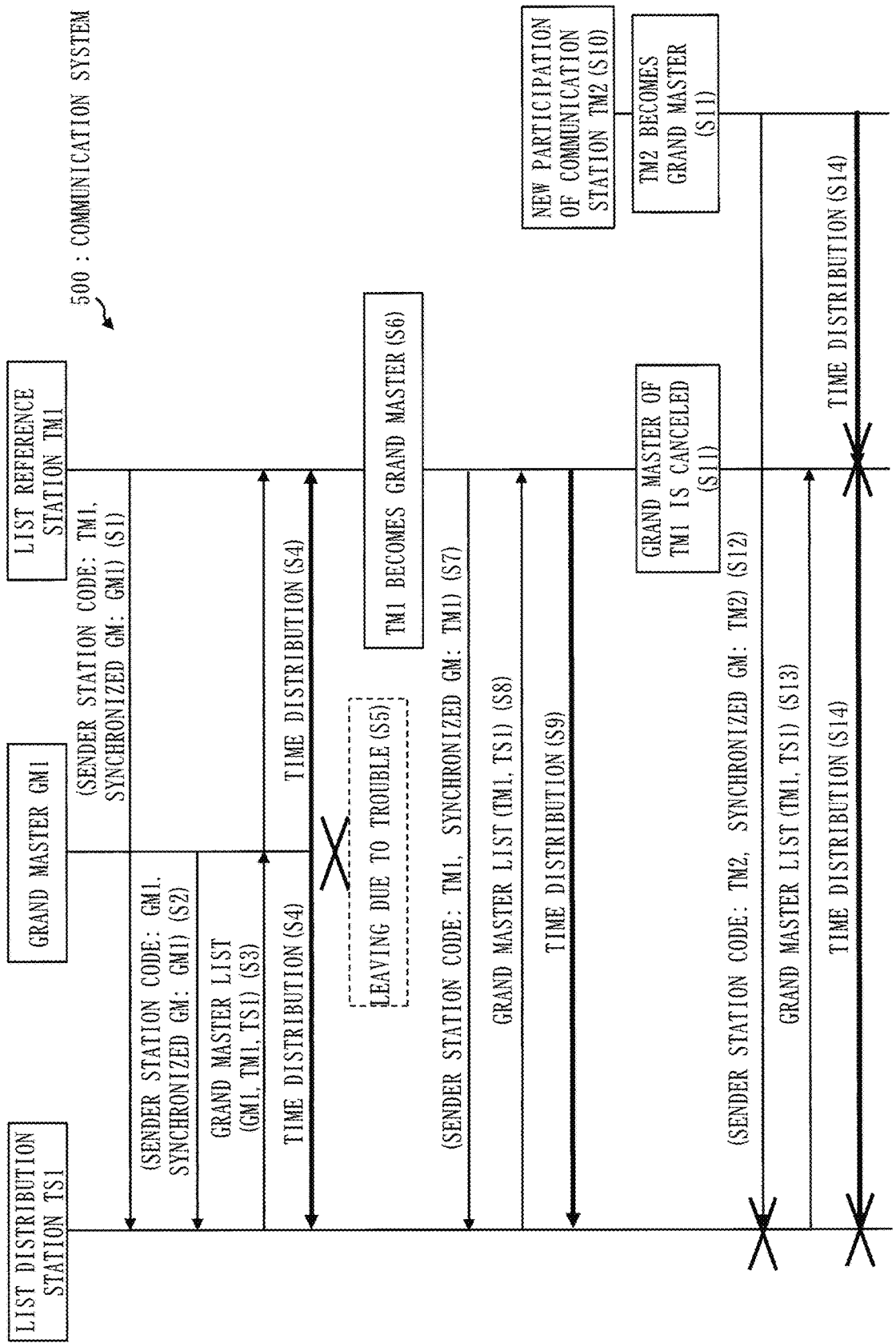
FIG. 15 shows a communication sequence illustrating a specific example of the operations of the communication system according to Embodiment 1.

FIG. 15 is a diagram illustrating an example of a specific example of operations of the communication system 500 according to the present embodiment.

In FIG. 15, assume that the communication system 500 is provided with a list distribution station TS1, a grand master GM1, and a list reference station TM1, as the communication stations 10.

In step S1, the list reference station TM1 sends a reference master notification frame with a sender station code TM1 and with a station code GM1 of the synchronized grand master. Likewise, in step S2, the grand master GM1 sends a reference master notification frame with a sender station code GM1 and with a station code GM1 of the synchronized grand master.

In step S3, the list distribution station TS1 sends a grand master list (GM1, TM1, TS1) to the grand master GM1 and the list reference station TM1.

In step S4, the grand master GM1 sends a time distribution frame. Since the time distribution frame is from GM1 on the grand master list, the list reference station TM1 and the list distribution station TS1 are time-synchronized based on this time distribution frame.

In step S5, assume that the grand master GM1 leaves the communication system 500 due to trouble.

Then, in step S6, assume that the list reference station TM1 becomes a grand master.

In step S7, the list reference station TM1 which is the grand master sends a reference master notification frame with a sender station code TM1 and with a station code TM1 of the synchronized grand master. At this time, since TM1 is in the synchronized communication station in the grand master list, the list distribution station TS1 switches the station code of the present grand master to TM1. Also, GM1 is deleted from the grand master list. The list distribution station TS1 deletes the grand master from the grand master list because either (e) or (f) of the following is not received from the grand master any longer.
(e) The reference master notification frame 24 storing the same sender station code.
(f) The priority notification frame 21 storing the same sender station code.

In step S8, the list distribution station TS1 sends a grand master list (TM1, TS1) to the list reference station TM1.

In step S9, the list reference station TM1 which is the grand master sends a time distribution frame. Since this time distribution frame is from TM1 on the grand master list, the list distribution station TS1 is time-synchronized based on this time distribution frame.

In step S10, assume that a communication station TM2 having priority higher than the list reference station TM1 newly participates.

In step S11, the grand master of the list reference station TM1 is cancelled by grand master adjustment performed by the communication system 500, and the newly participating communication station TM2 becomes the grand master.

In step S12, the newly participating communication station TM2 sends, for example, a reference master notification frame with a sender station code TM2 and with a station code TM2 of the synchronized grand master. At this time, since TM2 is not on the grand master list, the list distribution station TS1 does not add TM2 to the grand master list.

Hence, in step S13, the list distribution station TS1 sends a grand master list (TM1, TS1).

In step S14, the newly participating communication station TM2 sends a time distribution frame. Since this time distribution frame is from TM2 not on the grand master list, the list distribution station TS1 and the list reference station TM1 are not time-synchronized.

\*\*\*Description of Effect of Present Embodiment\*\*\*

As described above, in the communication system 500, time correction is performed with referring to time information of the communication station synchronized with the grand master that has been referred to in the past. Hence, with the communication system 500 according to the present embodiment, time continuity can be guaranteed.

Also, with the communication system 500 according to the present embodiment, even if a communication station that does not implement this method exists mixedly, time continuity can be guaranteed.

Also, in the communication system 500 according to the present embodiment, even if a plurality of list distribution stations exist in the same network, it is not contradictory. Therefore, even if a plurality of networks that have referred to different times are connected erroneously, time continuity can be guaranteed in each network.

Also, with the communication system 500 according to the present embodiment, since the communication station refers only to a single grand master list, setting error is not likely to occur among stations.

\*\*\*Other Configurations\*\*\*
<Modification 1>

In the present embodiment, the functions of the priority notification unit 101, priority monitoring unit 102, reference time correction unit 103, time distribution unit 104, list recording unit 105, list update unit 106, and list notification unit 107 in the list distribution station 100 are implemented by software. Also, the functions of the priority notification unit 201, priority monitoring unit 202, reference time correction unit 203, time distribution unit 204, list recording unit 205, and reference master notification unit 208 in the list reference station 200 are implemented by software. Also, the functions of the priority notification unit 301, priority monitoring unit 302, time distribution unit 304, and time correction unit 309 in the general station 300 are implemented by software. In short, the functions of each station of the communication system 500 are implemented by software.

According to a modification, the functions of each station of the communication system 500 may be implemented by hardware. In this case, the communication system 500 is provided with an electronic circuit in place of the processor 910. That is, each station of the communication system 500 is provided with the electronic circuit, a memory 921, an auxiliary storage device 922, an input interface 930, an output interface 940, and a communication device 950.

The electronic circuit is a dedicated electronic circuit that implements the functions of each station of the communication system 500.

The electronic circuit is specifically a single circuit, a composite circuit, a programmed processor, a parallel-programmed processor, a logic IC, a GA, an ASIC, or an FPGA. Note that GA stands for Gate Array, ASIC for Application Specific Integrated Circuit, and FPGA for Field-Programmable Gate Array.

The functions of each station of the communication system 500 may be implemented by one electronic circuit, or may be distributed among a plurality of electronic circuits and implemented by the plurality of electronic circuits.

According to another modification, some of the functions of each station of the communication system 500 may be implemented by an electronic circuit, and the remaining functions may be implemented by software.

The processor and the electronic circuit are each called processing circuitry as well. That is, in the communication system 500, the functions of each station of the communication system 500 are implemented by processing circuitry.

Embodiment 2

In the present embodiment, a difference from Embodiment 1 will mainly be described. The same configuration as in Embodiment 1 will be denoted by the same reference sign, and its description may sometimes be omitted.

In the communication system described in Embodiment 1, time correction is performed with using only the time information of the communication station synchronized with the grand master it has referred to in the past. Therefore, time continuity is guaranteed. In the present embodiment, a communication system will be described in which making reference to a time of a newly participating communication station can be performed intentionally even if time continuity is lost.

In the present embodiment, a list distribution station 100 is provided with an input device serving as an interface to update a grand master list manually. Specifically, the list distribution station 100 is connected to the input device such as the mouse, the keyboard, and the touch panel which are described above, via an input interface 930. The list distribution station 100 acquires a station code, which has been set manually, of the grand master with using the input device, via the input interface 930. A list update unit 106 of the list distribution station 100 causes the grand master station code acquired via the input interface 930, to be reflected in the grand master list.

For example, in step S12 of FIG. 15, assume that a list distribution station TS1 acquires, via the input interface 930, an instruction to set TM2 as the grand master. Then, the list update unit 106 updates a station code of the grand master on the grand master list with TM2.

In this manner, the list update unit 106, when notified of the station code of the grand master by the input device via the input interface 930, updates the station code of the present grand master station on the grand master list with the notified station code of the grand master station. By additionally writing the newly participating communication station TM2 manually on the grand master list in this manner, it becomes possible to handle a case of making reference to a time of a newly participating communication station intentionally. A case of adding a newly participating communication station to the grand master list has been described. Alternatively, a communication station already provided to the communication system may be added to the grand master list intentionally.

Embodiment 3

In the present embodiment, a difference from Embodiment 1 will mainly be described. The same configuration as in Embodiment 1 will be denoted by the same reference sign, and its description may sometimes be omitted.

The communication system described in Embodiment 1 requires two types of communication stations, namely, the list distribution station 100 and the list reference station 200. In the present embodiment, a communication system 500*a* will be described that implements the same functions as in Embodiment 1 with one type of communication station.

Figure 16:
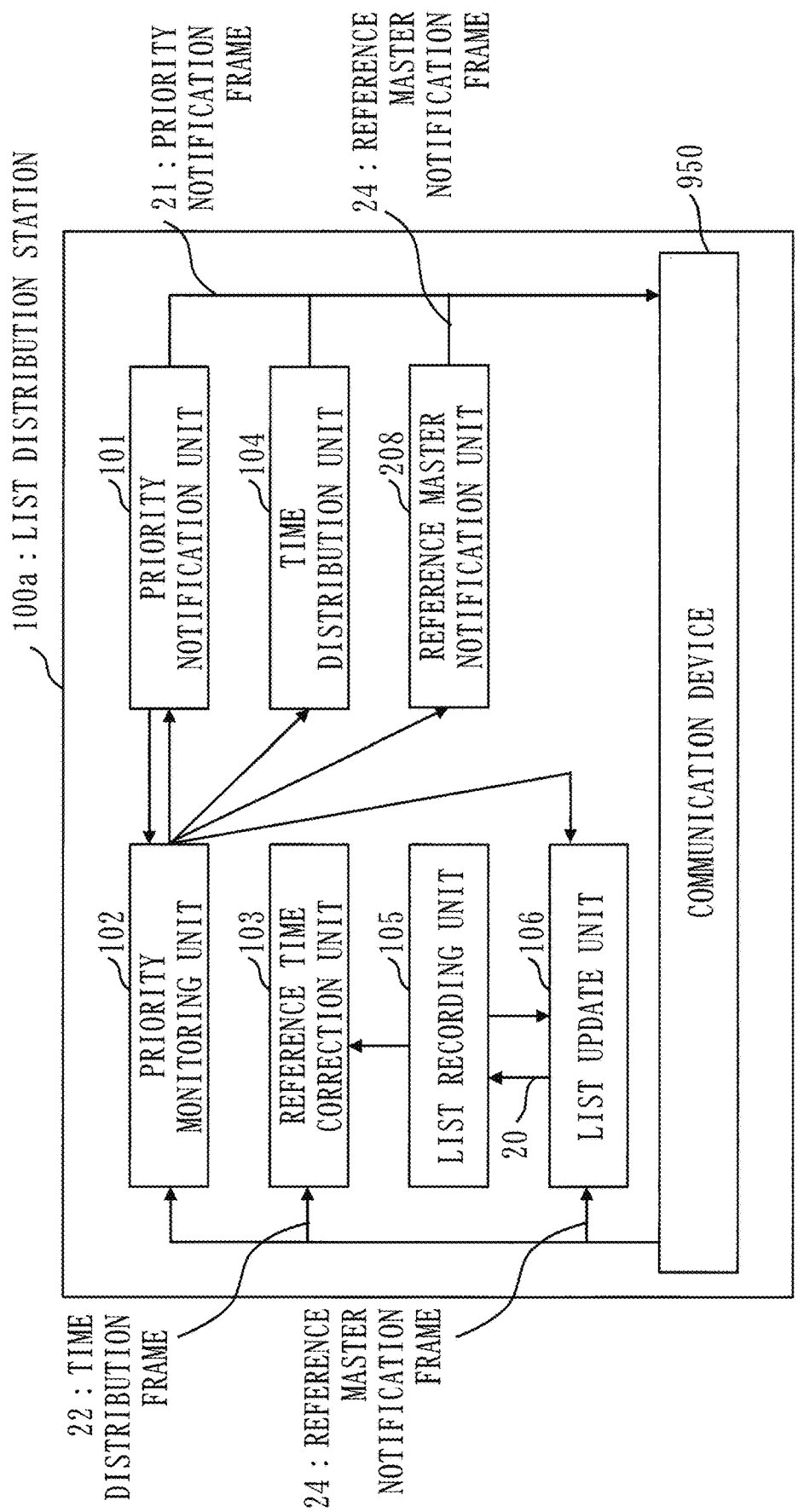
FIG. 16 is a function configuration diagram of a list distribution station according to Embodiment 3.

FIG. 16 is a diagram illustrating a configuration of a list distribution station 100*a* according to the present embodiment.

The communication system 500*a* according to the present embodiment is provided with the list distribution station 100*a* which is one type of communication station. The list distribution station 100*a* does not have an equivalent to the list notification unit 107 of the list distribution station 100 of Embodiment 1. That is, the list distribution station 100*a* does not distribute a grand master list to another communication station. The list distribution station 100*a* is provided with a reference master notification unit 208 which is an equivalent to that of the list reference station 200 of Embodiment 1.

A communication sequence of the communication system 500*a* according to the present embodiment will be described with referring to FIG. 17.

In step S21, a list distribution station TM4 sends a reference master notification frame with a sender station code TM4 and with a station code GM1 of a synchronized grand master.

In step S22, a grand master GM1 sends a reference master notification frame with a sender station code GM1 and with the station code GM1 of the synchronized grand master.

In step S23, a list distribution station TM3 sends a reference master notification frame with a sender station code TM3 and with the station code GM1 of the synchronized grand master.

At this time point, the grand master list has been generated by the list distribution station TM3, the grand master GM1, and the list distribution station TM4, and has been recorded in a list recording unit.

In step S24, the grand master GM1 sends a time distribution frame. Since this time distribution frame is from GM1 on the grand master list, the list distribution station TM3 and the list distribution station TM4 are time-synchronized based on this time distribution frame.

In step S25, assume that the grand master GM1 leaves the communication system 500*a* due to trouble.

Then, in step S26, assume that the list distribution station TM4 becomes a grand master.

In step S27, the list distribution station TM4 which is the grand master sends a reference master notification frame with a sender station code TM4 and with a station code TM4 of the synchronized grand master. At this time, since TM4 is in the synchronized communication station in the grand master list, the list distribution station TM3 switches the station code of the present grand master to TM4. Also, GM1 is deleted from the grand master list. The list distribution station TM3 deletes the grand master from the grand master list because either (e) or (f) of the following is not received from the grand master any longer.

(e) The reference master notification frame 24 containing the same sender station code.

(f) The priority notification frame 21 containing the same sender station code.

In step S28, the list distribution station TM3 sends a reference master notification frame with the sender station code TM3 and with the station code TM4 of the synchronized grand master. At this time, the list distribution station TM4 performs nothing since TM3 is in the synchronized communication station in the grand master list. Also, GM1 is deleted from the grand master list. The list distribution station TM4 deletes the grand master from the grand master list because either (e) or (f) of the following is not received from the grand master any longer.

(e) The reference master notification frame 24 containing the same sender station code.

(f) The priority notification frame 21 containing the same sender station code.

In step S29, the list distribution station TM4 which is the grand master sends a time distribution frame. Since the time distribution frame is from TM4 on the grand master frame, the list distribution station TM3 is time-synchronized based on this time distribution frame.

As described above, in the communication system 500a, the list notification unit of the list distribution station is eliminated, and a reference master notification unit is added instead. Therefore, with the communication system 500a according to the present embodiment, time continuity can be guaranteed without distributing a grand master list by one type of communication station.

In the above Embodiments 1 to 3, each unit of each station of the communication station is described as an independent function block. However, the configuration of the communication station need not be a configuration as in the embodiments described above. The function blocks of each station of the communication system may be of any configuration as far as it can implement the functions described in the above embodiments. Also, each station of the communication system may form a system composed of a plurality of devices instead of a single device.

Of Embodiments 1 to 3, a plurality of portions may be combined and practiced. Alternatively, of these embodiments, only one portion may be practiced. Furthermore, these embodiments may be combined in any manner as a whole or partially, and may be practiced.

That is, through Embodiments 1 to 3, the individual embodiments may be combined in any manner, an arbitrary constituent element in the individual embodiment may be modified, or an arbitrary constituent element in the individual embodiment may be omitted.

The embodiments described above are essentially preferred exemplifications and are not intended to limit the scope of the present invention, the scope of an applied product of the present invention, and a scope of usage of the present invention. Various changes may be made as necessary to the embodiments described above.

REFERENCE SIGNS LIST

10: communication station; 20: grand master list; 21: priority notification frame; 22: time distribution frame; 23: list notification frame; 24: reference master notification frame; 100, 100a: list distribution station; 101, 201, 301: priority notification unit; 102, 202, 302: priority monitoring unit; 103, 203: reference time correction unit; 104, 204, 304: time distribution unit; 105, 205: list recording unit; 106: list update unit; 107: list notification unit; 208: reference master notification unit; 309: time correction unit; 200: list reference station; 300: general station; 500, 500a: communication system; 910: processor; 921: memory; 922: auxiliary storage device; 930: input interface; 940: output interface; 950: communication device.

The invention claimed is:

1. A communication system which comprises a plurality of communication stations and selects from among the plurality of communication stations a grand master to serve as a base of times of the plurality of communication stations, the communication system comprising a list distribution station being at least one communication station included among the plurality of communication stations, wherein the list distribution station comprises processing circuitry to record, in a memory, a grand master list containing a station code of the grand master and a station code of a communication station synchronized with the grand master, to receive a priority notification frame which contains, as a sender station code, a station code of a present grand master in the communication system, to decide, when notified of the station code of the present grand master, whether or not to update the grand master list based on the notified station code of the present grand master and the grand master list, and upon having decided to update the grand master list, to update the station code of the present grand master station on the grand master list with the notified station code of the present grand master station, and to additionally write the notified station code of the present grand master station, as the station code of the communication station synchronized with the present grand master station on the grand master list, and to send, when notified of the updated grand master list, a list notification frame containing the notified grand master list to the plurality of communication stations.

2. The communication system according to claim 1, wherein the communication system comprises a list reference station being at least one communication station included among the plurality of communication stations, wherein the list reference station comprises processing circuitry to record, in a memory, a grand master list containing a station code of the grand master and a station code of a communication station synchronized with the grand master, to receive, from another communication station, a time distribution frame containing time information for synchronizing the times of the plurality of communication stations, to decide whether or not a station code of a communication station as a sender of the time distribution frame is the station code of the grand master contained in the grand master list, and if the station code of the communication station as the sender of the time distribution frame is the station code of the grand master contained in the grand master list, to correct a time of an own station using the time information contained in the time distribution frame, and to receive a priority notification frame which contains, as the sender station code, the station code of the present grand master in the communication system.

3. The communication system according to claim 2,
wherein the processing circuitry of the list distribution station
sends, when notified of the updated grand master list, a list notification frame containing the notified grand master list to the plurality of communication stations.

4. The communication system according to claim 3,
wherein the processing circuitry of the list distribution station
decides whether or not the notified station code of the present grand master station is included as the station code of the communication station synchronized with the present grand master station on the grand master list, and if the notified station code of the present grand master station is included as the station code of the communication station synchronized with the present grand master station on the grand master list, decides to update the grand master list.

5. The communication system according to claim 2,
wherein the processing circuitry of the list reference station
decides, when notified of the station code of the present grand master, whether or not the station code of the present grand master is the station code of the grand master contained in the grand master list, and if the station code of the present grand master is the station code of the grand master contained in the grand master list, treats a station code of the own station as the sender station code, and sends a reference master notification frame containing the sender station code and the station code of the present grand master station, and
wherein the processing circuitry of the list distribution station, upon reception of the reference master notification frame from the processing circuitry of the list reference station, decides whether or not to update the grand master list, based on the station code of the present grand master station contained in the received reference master notification frame, and upon having decided to update the grand master list, additionally writes the sender station code contained in the reference master notification frame, as the station code of the communication station synchronized with the present grand master station on the grand master list.

6. The communication system according to claim 5,
wherein the processing circuitry of the list distribution station
decides whether or not the station code of the present grand master station contained in the reference master notification frame received from the processing circuitry of the list reference station coincides with the station code of the present grand master station on the grand master list, and if coincidence is found, decides to update the grand master list.

7. The communication system according to claim 5,
wherein the processing circuitry of the list distribution station
decides whether neither a reference master notification frame containing the same sender station code nor a priority notification frame containing the same sender station code is received within a predetermined period of time, and if neither the reference master notification frame nor the priority notification frame is received, deletes the sender station code, as the station code of the communication station synchronized with the present grand master station on the grand master list.

8. The communication system according to claim 5,
wherein the communication system comprises
the list distribution station to update the grand master list, the list distribution station being at least one communication station included among the plurality of communication stations,
wherein the processing circuitry of the list distribution station
records, in a memory, a grand master list containing a station code of the grand master and a station code of a communication station synchronized with the grand master,
receives, from another communication station, a time distribution frame containing time information for synchronizing the times of the plurality of communication stations, decides whether or not a station code of a communication station as a sender of the time distribution frame is the station code of the grand master contained in the grand master list, and if the station code of the communication station as the sender of the time distribution frame is the station code of the grand master contained in the grand master list, corrects a time of an own station using the time information contained in the time distribution frame,
receives a priority notification frame which contains, as a sender station code, a station code of a present grand master in the communication system, and
updates, when notified of a station code of a grand master by an input device via an input interface, the station code of the present grand master station on the grand master list with the notified station code of the grand master station.

9. The communication system according to claim 8,
wherein the processing circuitry of the list distribution station
decides whether or not the station code of the present grand master station contained in the reference master notification frame received from the processing circuitry of the list reference station coincides with the station code of the present grand master station on the grand master list, and if coincidence is found, decides to update the grand master list.

10. The communication system according to claim 5,
wherein the processing circuitry of the list distribution station
decides, when notified of the station code of the present grand master, whether or not the station code of the present grand master is the station code of the grand master contained in the grand master list, and if the station code of the present grand master is the station code of the grand master contained in the grand master list, treats a station code of the own station as the sender station code, and sends a reference master notification frame containing the sender station code and the station code of the present grand master station.

11. A list distribution station being at least one communication station included in a communication system which comprises a plurality of communication stations and which selects from among the plurality of communication stations a grand master to serve as a base of times of the plurality of communication stations, the list distribution station comprising:
processing circuitry to record, in a memory, a grand master list containing a station code of the grand master and a station code of a communication station synchronized with the grand master;

to receive a priority notification frame which contains, as a sender station code, a station code of a present grand master in the communication system;

to decide, when notified of the station code of the present grand master, whether or not to update the grand master list based on the notified station code of the present grand master and the grand master list, and upon having decided to update the grand master list, to update the station code of the present grand master station on the grand master list with the notified station code of the present grand master station, and to additionally write the notified station code of the present grand master station, as the station code of the communication station synchronized with the present grand master station on the grand master list; and to send, when notified of the updated grand master list, a list notification frame containing the notified grand master list to the plurality of communication stations.

12. A communication method for a communication system which comprises a plurality of communication stations and selects from among the plurality of communication stations a grand master to serve as a base of times of the plurality of communication stations, the communication system comprising a list distribution station being at least one communication station included among the plurality of communication stations, wherein the communication method comprises recording, in a memory, a grand master list containing a station code of the grand master and a station code of a communication station synchronized with the grand master, receiving a priority notification frame which contains, as a sender station code, a station code of a present grand master in the communication system, deciding, when notified of the station code of the present grand master, whether or not to update the grand master list based on the notified station code of the present grand master and the grand master list, and upon having decided to update the grand master list, updating the station code of the present grand master station on the grand master list with the notified station code of the present grand master station, and additionally writing the notified station code of the present grand master station, as a station code of a communication station synchronized with the present grand master station on the grand master list, and sending, when notified of the updated grand master list, a list notification frame containing the notified grand master list to the plurality of communication stations.

13. A non-transitory computer readable medium recorded with a communication program for a communication system which comprises a plurality of communication stations and selects from among the plurality of communication stations a grand master to serve as a base of times of the plurality of communication stations, the communication system comprising a list distribution station being at least one communication station included among the plurality of communication stations, wherein the communication program comprises a list recording process of recording, in a memory, a grand master list containing a station code of the grand master and a station code of a communication station synchronized with the grand master, a priority monitoring process of receiving a priority notification frame which contains, as a sender station code, a station code of a present grand master in the communication system, a list update process of deciding, when notified of the station code of the present grand master, whether or not to update the grand master list based on the notified station code of the present grand master and the grand master list, and upon having decided to update the grand master list, updating the station code of the present grand master station on the grand master list with the station code of the present grand master station which is notified by the priority monitoring process, and additionally writing the station code of the present grand master station which is notified by the priority monitoring process, as a station code of a communication station synchronized with the present grand master station on the grand master list, and a list notification process of sending, when notified of the grand master list updated by the list update process, a list notification frame containing the notified grand master list to the plurality of communication stations.

* * * * *